US011272655B2

(12) United States Patent
Antle et al.

(10) Patent No.: US 11,272,655 B2
(45) Date of Patent: Mar. 15, 2022

(54) MODULAR SMART IMPLEMENT FOR PRECISION AGRICULTURE

(71) Applicant: Stout Industrial Technology, Inc., Salinas, CA (US)

(72) Inventors: Jeffrey L. Antle, Salinas, CA (US); Steven T. Snyder, Salinas, CA (US); Austin J. Larick, Salinas, CA (US)

(73) Assignee: Stout Industrial Technology, Inc., Salinas, CA (US)

( * ) Notice: Subject to any disclaimer, the term of this patent is extended or adjusted under 35 U.S.C. 154(b) by 0 days.

(21) Appl. No.: 17/171,953

(22) Filed: Feb. 9, 2021

(65) Prior Publication Data

US 2021/0243937 A1 Aug. 12, 2021

Related U.S. Application Data

(60) Provisional application No. 63/074,544, filed on Sep. 4, 2020, provisional application No. 62/972,641, filed
(Continued)

(51) Int. Cl.
*A01B 71/02* (2006.01)
*A01B 63/00* (2006.01)
(Continued)

(52) U.S. Cl.
CPC ............ *A01B 71/02* (2013.01); *A01B 63/002* (2013.01); *A01B 63/008* (2013.01); *A01B 63/10* (2013.01);
(Continued)

(58) Field of Classification Search
CPC ....... A01B 71/02; A01B 71/00; A01B 63/002; A01B 63/008; A01B 63/10; A01B 79/005;
(Continued)

(56) References Cited

U.S. PATENT DOCUMENTS 2,920,707 A 1/1960 Oliphant
3,851,451 A 12/1974 Agness et al.
(Continued)

FOREIGN PATENT DOCUMENTS

EP 1116427 9/2004
EP 3278649 8/2017
(Continued)

OTHER PUBLICATIONS

John Deere; 600FD-Flexible Draper Active Header Height Control (AHHC) Quick Reference Guide; Downloaded from the Internet on Feb. 4, 2020 from https://www.deere.com/assets/pdfs/common/parts-and-service/manuals-training/600FD-Flexible-Draper.pdf.
(Continued)

*Primary Examiner* — Christopher J. Novosad
(74) *Attorney, Agent, or Firm* — Frost Brown Todd LLC; Dennis S. Schell

(57) ABSTRACT

An illustrative modular smart implement for precision agriculture includes a chassis having a hydraulic system, a control system, and articulating tool arms that are adapted to releasably receive one of a tool attachment for working a crop and/or field, including precision planting, cultivating, thinning, spraying, harvesting, and/or data collection. A toolbar fixed to the chassis receives and supports the articulating tools arms. An alignment member and side shift actuator provide movement of a portion of the tool arms along an axis parallel to a longitudinal axis of the toolbar, and a lift actuator provide movement along a vertical axis.

21 Claims, 14 Drawing Sheets

Related U.S. Application Data on Feb. 10, 2020, provisional application No. 62/971,991, filed on Feb. 9, 2020.

(51) Int. Cl.

| | | |
|---|---|---|
| *A01B 79/00* | (2006.01) | |
| *A01B 63/10* | (2006.01) | |
| *A01M 21/02* | (2006.01) | |
| *G06K 9/00* | (2006.01) | |
| *G06K 9/62* | (2006.01) | |

(52) U.S. Cl.
CPC ........... *A01B 79/005* (2013.01); *A01M 21/02* (2013.01); *G06K 9/00657* (2013.01); *G06K 9/627* (2013.01)

(58) Field of Classification Search
CPC ........ A01B 63/00; A01B 79/00; A01M 21/02; A01M 21/00; G06K 9/00657; G06K 9/627; G06K 9/0003; G06K 9/00624; G06K 9/00; G06K 9/6268; G06K 9/6267; G06K 9/62
See application file for complete search history.

(56) References Cited

U.S. PATENT DOCUMENTS

| | | |
|---|---|---|
| 6,374,155 B1 | 4/2002 | Wallach et al. |
| 9,980,421 B1 | 5/2018 | Hammes |
| 10,008,035 B1 | 6/2018 | Redden et al. |
| 10,390,481 B1 | 8/2019 | Brown et al. |
| 2002/0095239 A1 | 7/2002 | Wallach et al. |
| 2002/0178710 A1 | 12/2002 | Engelstad et al. |
| 2005/0126144 A1 | 6/2005 | Koselka et al. |
| 2006/0012673 A1 | 1/2006 | Koselka et al. |
| 2006/0213167 A1 | 9/2006 | Koselka et al. |
| 2007/0195160 A1 | 8/2007 | Koselka et al. |
| 2008/0155954 A1 | 7/2008 | Schlipf |
| 2009/0210119 A1 | 8/2009 | Poulsen |
| 2010/0037582 A1 | 2/2010 | Sauerwein |
| 2011/0137456 A1 | 6/2011 | Koselka et al. |
| 2011/0211733 A1 | 9/2011 | Schwartz |
| 2012/0048160 A1 | 3/2012 | Adams et al. |
| 2012/0060730 A1 | 3/2012 | Bassett |
| 2013/0204437 A1 | 8/2013 | Koselka et al. |
| 2013/0235183 A1 | 9/2013 | Redden |
| 2013/0238201 A1 | 9/2013 | Redden |
| 2013/0269456 A1 | 10/2013 | Jones |
| 2014/0021267 A1 | 1/2014 | Sudduth et al. |
| 2015/0015697 A1 | 1/2015 | Redden et al. |
| 2015/0027040 A1 | 1/2015 | Redden |
| 2015/0027041 A1 | 1/2015 | Redden |
| 2015/0027043 A1 | 1/2015 | Redden |
| 2015/0027044 A1 | 1/2015 | Redden |
| 2015/0051779 A1 | 2/2015 | Camacho-Cook et al. |
| 2015/0150188 A1 | 6/2015 | Stroot et al. |
| 2015/0237790 A1 | 8/2015 | Redden et al. |
| 2015/0237791 A1 | 8/2015 | Bassett et al. |
| 2015/0245554 A1 | 9/2015 | Redden |
| 2016/0066505 A1 | 3/2016 | Bakke et al. |
| 2016/0157415 A1 | 6/2016 | Cavender-Bares et al. |
| 2016/0255778 A1 | 9/2016 | Redden et al. |
| 2017/0206415 A1 | 7/2017 | Redden |
| 2017/0219711 A1 | 8/2017 | Redden et al. |
| 2017/0227969 A1 | 8/2017 | Murray et al. |
| 2017/0251589 A1 | 9/2017 | Tippery et al. |
| 2017/0290260 A1 | 10/2017 | Redden et al. |
| 2017/0359943 A1 | 12/2017 | Calleija et al. |
| 2018/0116094 A1 | 5/2018 | Redden |
| 2018/0121725 A1 | 5/2018 | Redden et al. |
| 2018/0121726 A1 | 5/2018 | Redden et al. |
| 2018/0153084 A1 | 6/2018 | Calleija et al. |
| 2018/0286117 A1 | 10/2018 | Redden et al. |
| 2018/0325019 A1* | 11/2018 | Connell ................. A01C 5/062 |
| 2018/0330166 A1 | 11/2018 | Redden et al. |
| 2019/0064363 A1 | 2/2019 | Redden et al. |
| 2019/0188847 A1 | 6/2019 | Gonzalez et al. |
| 2019/0239502 A1 | 8/2019 | Palomares et al. |
| 2019/0261581 A1 | 8/2019 | Redden et al. |
| 2019/0357520 A1 | 11/2019 | Redden et al. |
| 2019/0362146 A1 | 11/2019 | Polzounov et al. |
| 2019/0387678 A1 | 12/2019 | Knopf et al. |
| 2020/0073389 A1 | 3/2020 | Flajolet et al. |
| 2020/0296875 A1 | 9/2020 | Calleija et al. |

FOREIGN PATENT DOCUMENTS

| | | |
|---|---|---|
| EP | 3278649 | 2/2018 |
| KR | 101808686 | 12/2017 |
| WO | 2016099386 | 6/2016 |
| WO | 2016128688 | 8/2016 |
| WO | 2020154515 | 7/2020 |

OTHER PUBLICATIONS

Yangmin Xie, Andrew G. Alleyne, Ashley Greer and Dustin Deneault; Fundamental Limits in Combine Harvester Header Height Control; Article in Journal of Dynamic Systems Measurement and Control; Downloaded from the Internet on Feb. 4, 2020 from https://www.researchgate.net/publication/254261361_Fundamental_Limits_in_Combine_Harvester_Header_Height_Control.

John Deere; HydraFloat integrated suspension system improves ground following article; Downloaded from the Internet on Feb. 4, 2020 from http://salesmanual.deere.com/sales/salesmanual/en_NA/combines_headers/2011/feature/platforms_headers/draper/600d_hydrafloat_integrated_suspension_system.html.

Garford Robo-Pilot product page; Downloaded from the Internet on Feb. 4, 2020 from https://garford.com/products/robo-pilot/.

Garford Hoes Inter-row cultivation equipment product page; Downloaded from the Internet on Feb. 4, 2020 from https://www.nigelquinnams.co.uk/wp-content/uploads/2020/01/Interrow-hoes.pdf.

Garford; Robocrop Precision guided high speed hoes product page; Downloaded from the Internet on Feb. 4, 2020 from https://garford.com/wp-content/uploads/2018/07/Robocrop-Console.pdf.

F Poulsen Aps Engineering; Manual for Mechanical Weeding Robot ROBOVATOR; Downloaded from the Internet on Feb. 4, 2020 from http://www.visionweeding.com/ROBOVATOR%20MANUAL_9_english.doc.pdf.

Ferrari Construzioni Meccaniche; Remoweed product page; Downloaded from the Internet on Feb. 4, 2020 from https://ferraricostruzioni.com/modules/cws_downlaoditem/documents/d7dab4eb04e70c3995600c962b79877ad9d14dddREMOWEED_web.pdf.

Garford; Roborop Inrow Inter-row and Inter-Plant Weeder product page; Downloaded from the Internet on Feb. 4, 2020 from https://garford.com/wp-content/uploads/2018/07/Robocrop-InRow-.pdf.

Steketee; IC-Weeder Intellegent hoeing machine with single plant detection brochure; Downloaded from the Internet May 11, 2021 from https://pdf.agriexpo.online/pdf/machinefabriek-steketee-bv/ic-weeder/169628-29429.html.

Planttape Inc.; Three Point Planter; Downloaded from the Internet on May 11, 2021 from https://www.planttape.com/equipment/3-point-planter/.

Written Opinion of the International Searching Authority dated Jun. 24, 2021 for PCT/US21/17293.

* cited by examiner

US 11,272,655 B2

MODULAR SMART IMPLEMENT FOR PRECISION AGRICULTURE

CROSS-REFERENCE TO RELATED APPLICATION

This is a nonprovisional patent application of U.S. Provisional Patent Application No. 62/971,991, filed Feb. 9, 2020, and titled MODULAR PRECISION AGRICULTURE IMPLEMENT; U.S. Provisional Patent Application No. 62/972,641, filed Feb. 10, 2020, and titled MODULAR PRECISION AGRICULTURE IMPLEMENT; and U.S. Provisional Patent application No. 63/074,544, filed Sep. 4, 2020, and titled MODULAR PRECISION AGRICULTURE IMPLEMENT; each of which are incorporated herein by reference.

BACKGROUND

The present invention relates to automated machinery, and particularly, to a machine vision enabled agricultural implement.

SUMMARY

The present invention may comprise one or more of the features recited in the attached claims, and/or one or more of the following features and combinations thereof.

An illustrative modular precision agricultural implement provides a chassis having an electrical system, hydraulic system, control system, and modular smart tool arms that are adapted to releasably receive any one of a tool attachment for precision cultivating, thinning, spraying, and/or data collection. The tool arm includes a precision mounting platform for a vision system and the tool attachment and features a light weight and adjustable down force for precision ground following and/or commodity plant following.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying Figs. in which.

DESCRIPTION OF THE ILLUSTRATIVE EMBODIMENTS

Figure 1:
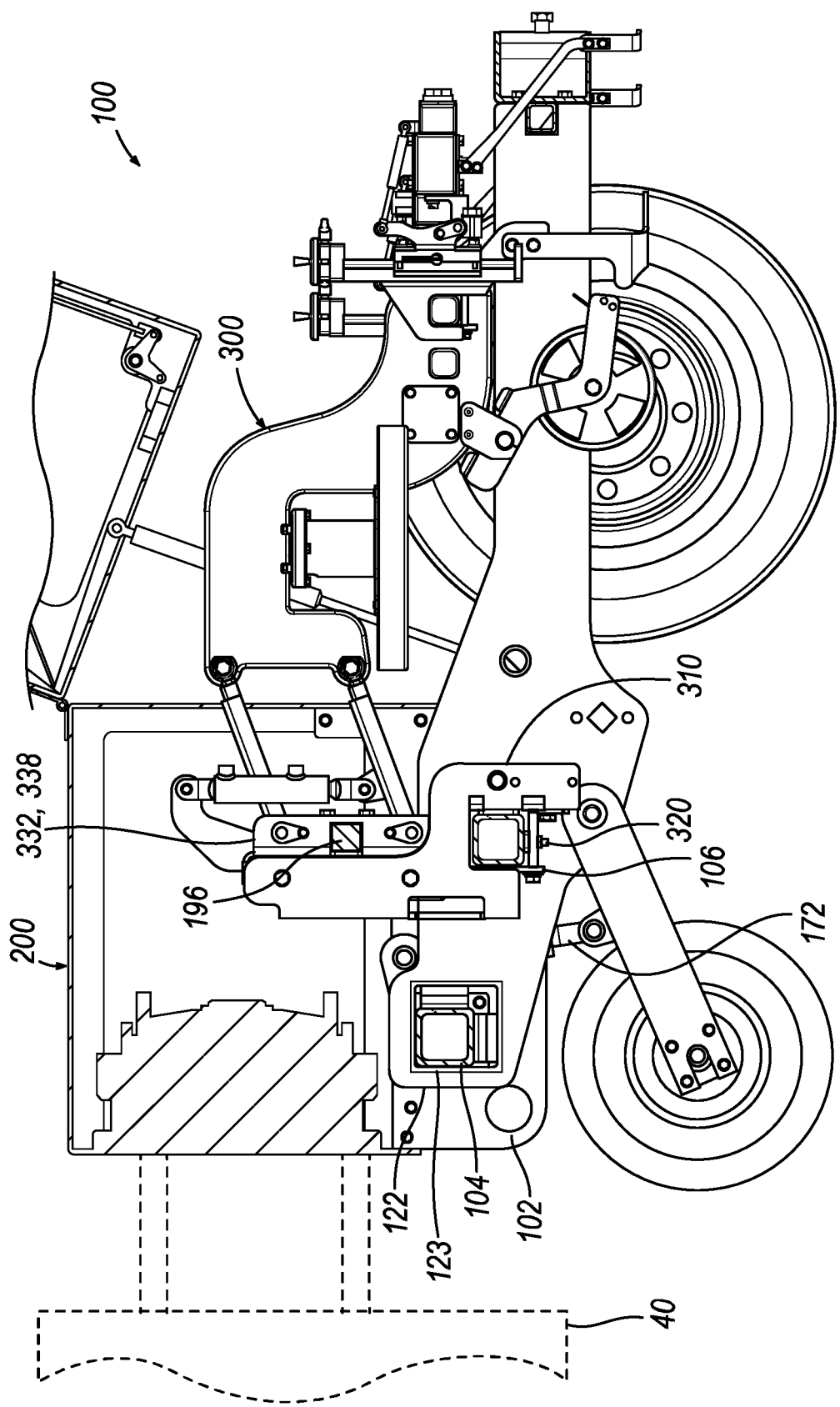
FIG. 1 is a cross-sectional elevational view of an agricultural implement 100 according to the present invention, taken along the section lines illustrated in FIG. 4A.

For the purposes of promoting and understanding the principals of the invention, reference will now be made to one or more illustrative embodiments illustrated in the drawings and specific language will be used to describe the same.

Figure 2:
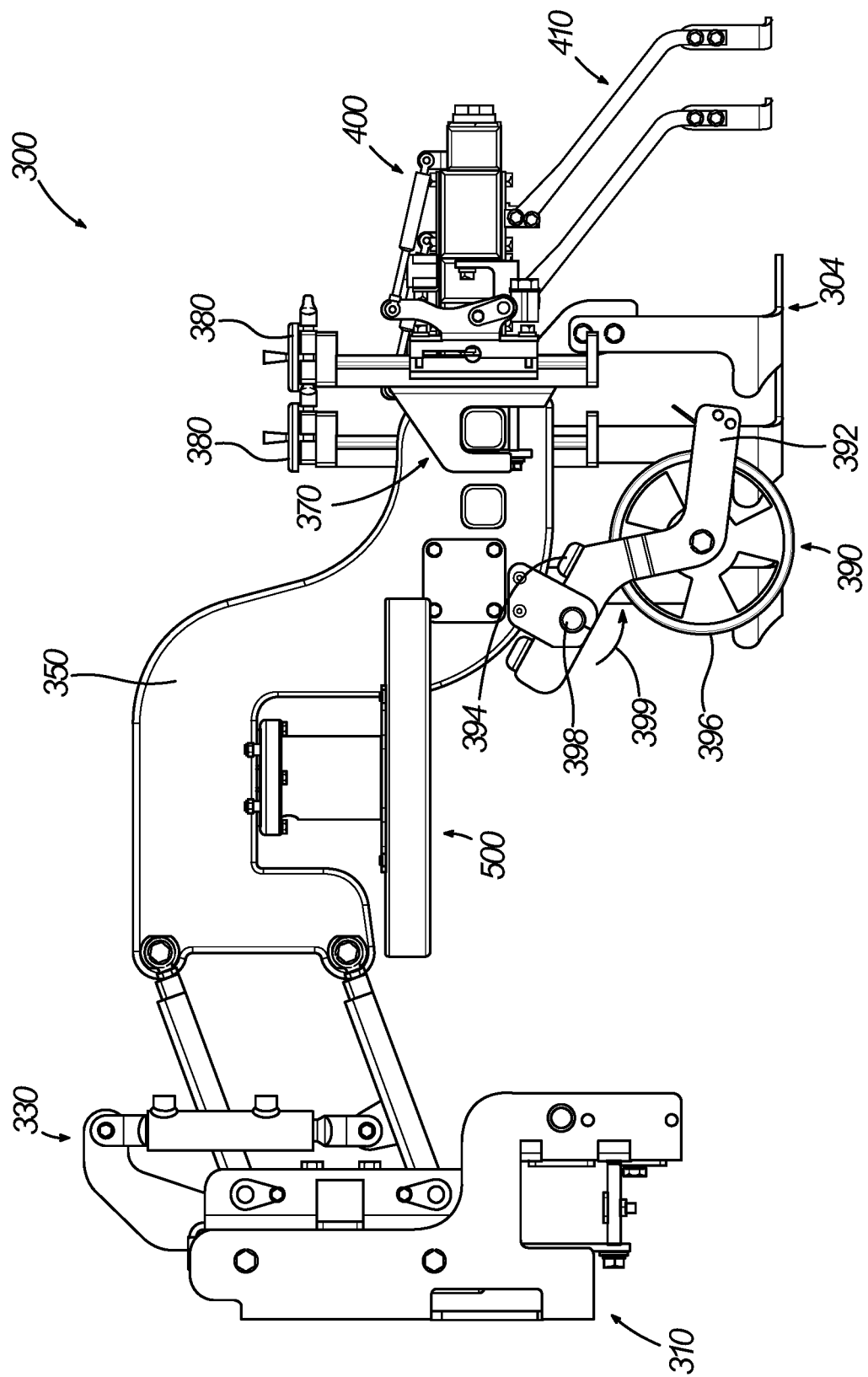
FIG. 2 is an elevational view of a tool arm 300 of the agricultural implement 100 of FIG. 1.
Figure 4A:
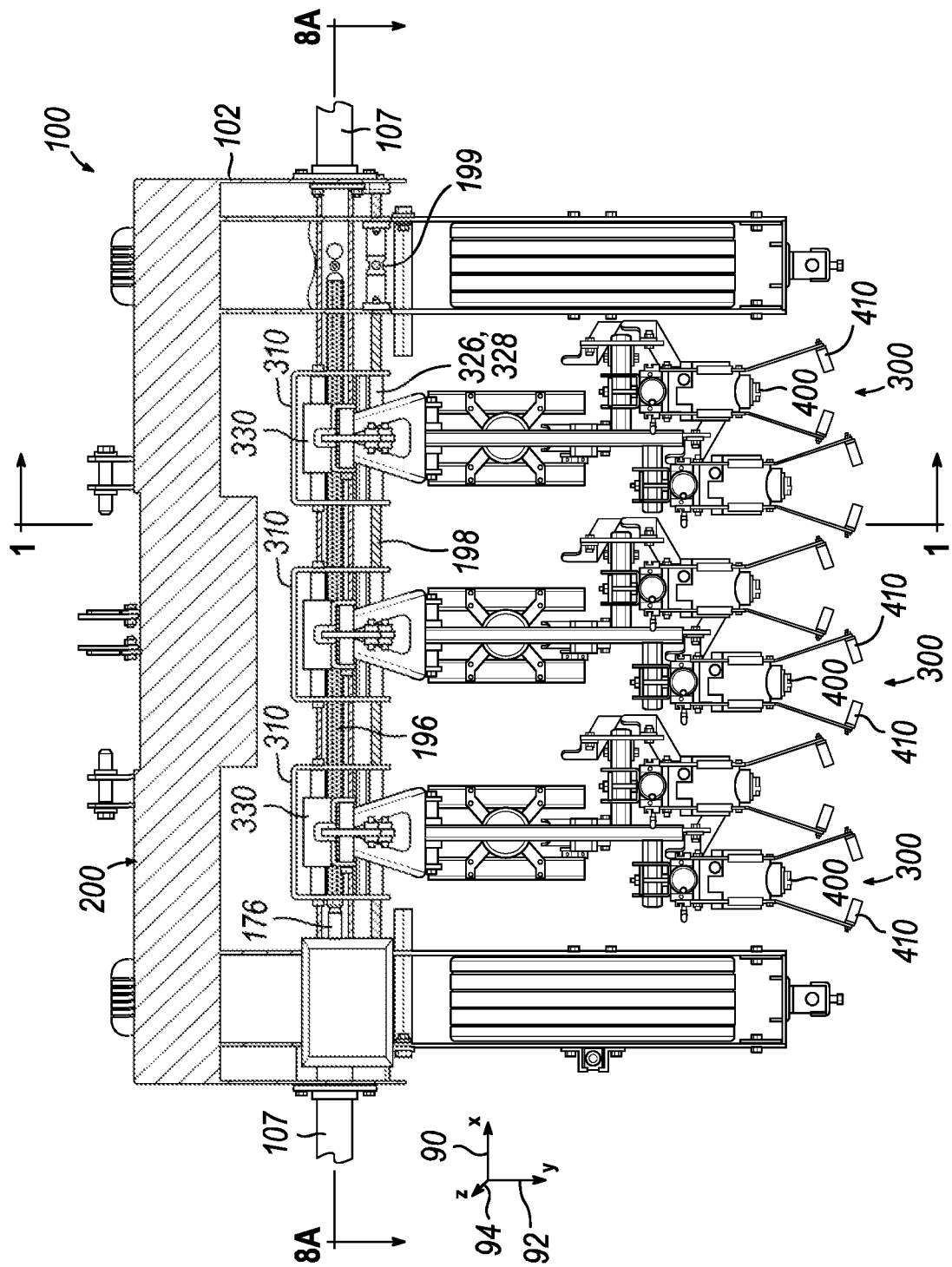
FIG. 4A is a cross-sectional top view of the agricultural implement 100 of FIG. 1 illustrated in a first state.
Figure 6:
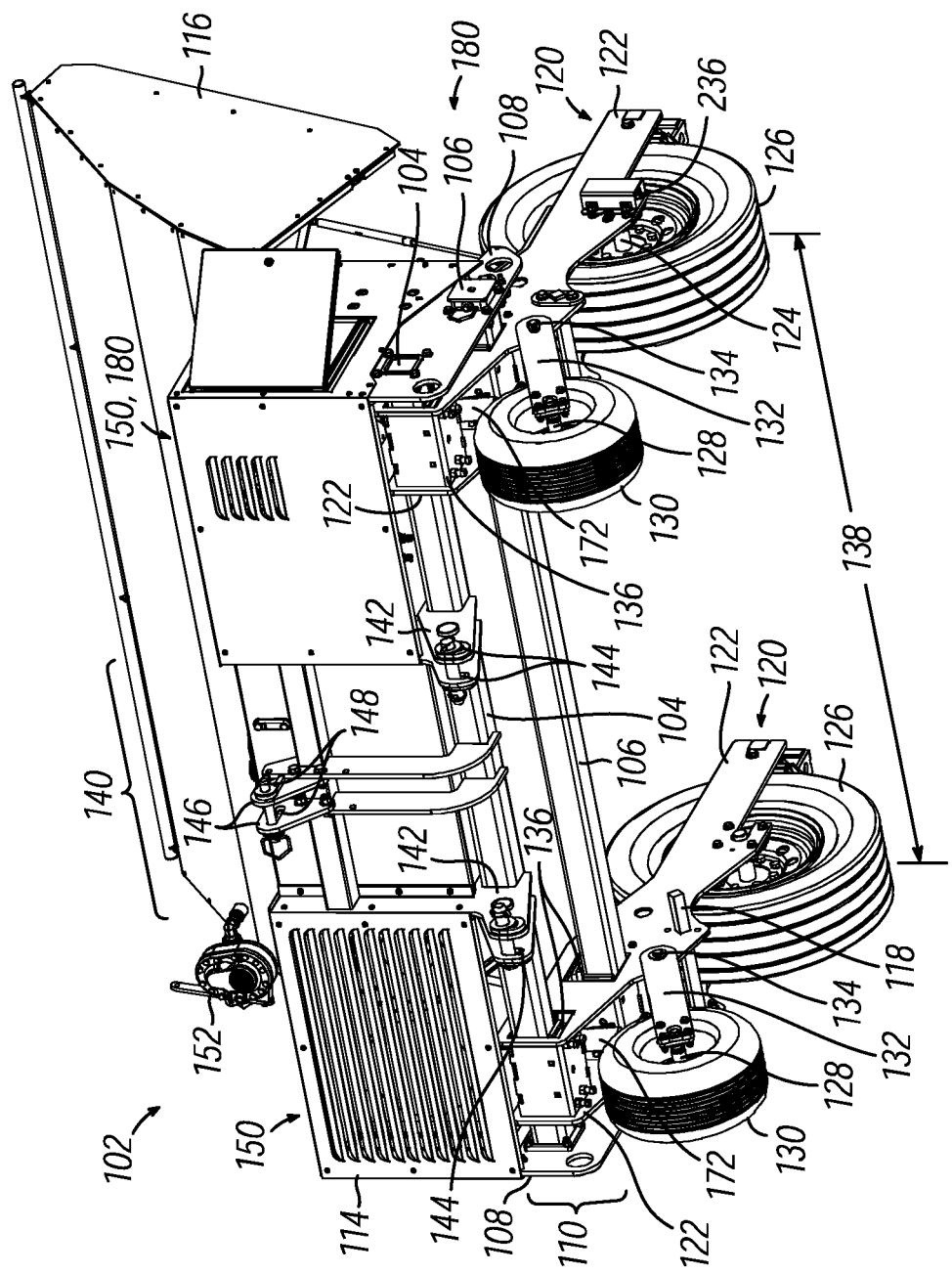
FIG. 6 is a bottom front perspective view of the chassis 102 of the agricultural implement 100 of FIG. 1.
Figure 7:
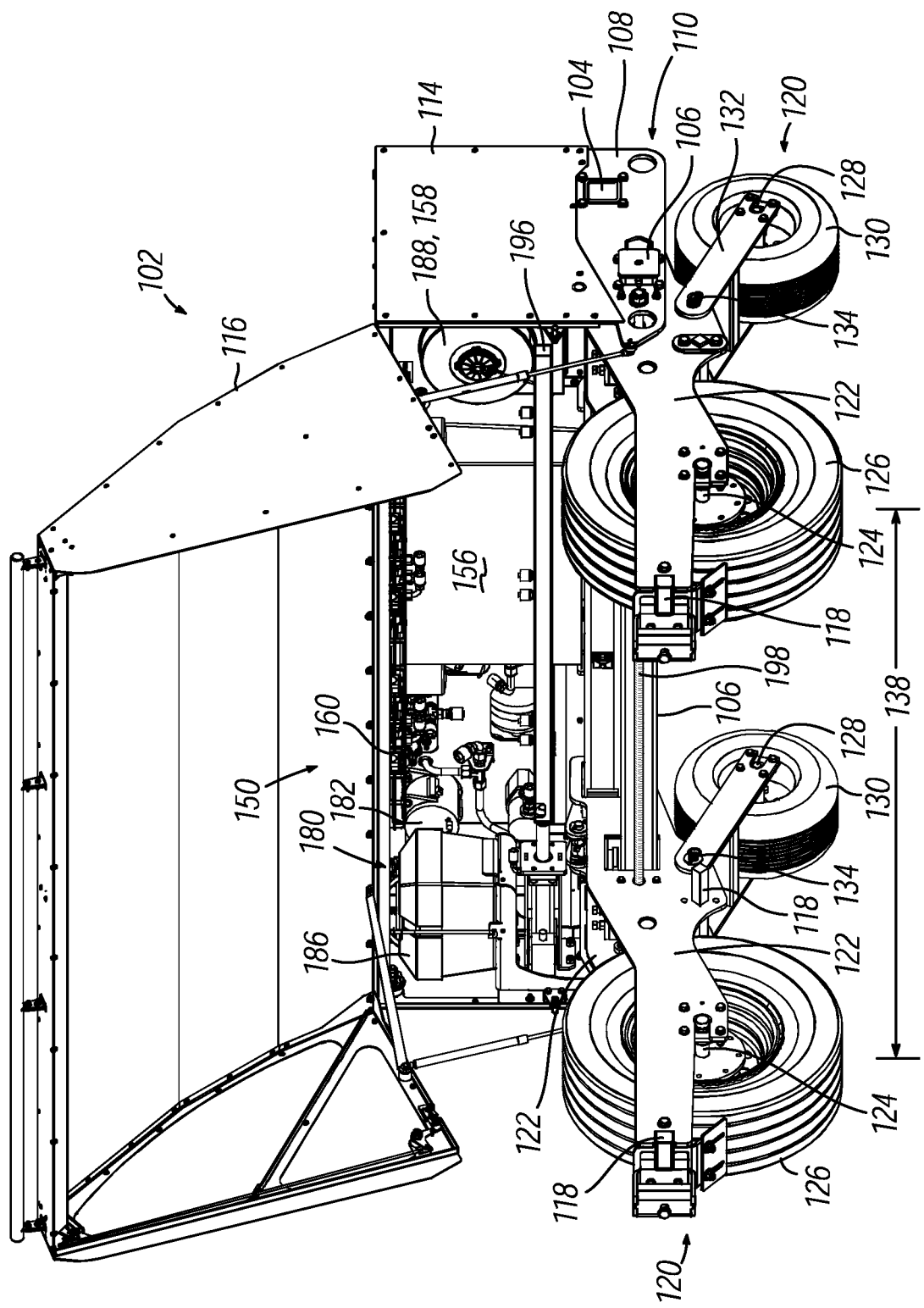
FIG. 7 is a rear perspective view of the chassis 102 of the agricultural implement 100 of FIG. 1.

Referring to FIG. 1, a cross-sectional elevational view, and FIG. 4A, a cross-sectional top view, an illustrative embodiment of modular precision agricultural implement 100 is shown. Implement 100 includes generally a chassis 102, control system 200, and modular smart tool arms 300. For clarity, FIG. 2 illustrates a modular smart tool arm 300 separated from the chassis 102, and FIGS. 6 and 7 illustrate a chassis 102 without any tool arms 300 attached.

Referring again to FIG. 4A, the illustrated implement 100 includes three tool arms 300, each of which include at least one agricultural tools for working a crop and/or field, for example, a pair of tool attachments 400. However, in other embodiments (not shown) fewer than three or more than three tool arms may used with implement 100. Each of the tool attachments 400 includes a pair of actuating tools 410, in this example hoes used for cultivating. In FIG. 4A, the tools 410 are shown in an open position; however, upon actuation, each pair of tools 410 travel together, closing the space there between. In alternative embodiments of tool attachment 400, aspects of the tool attachment and the control system 200 (computing and select other components of which may also be referred to collectively as 'controller' herein) may be adapted to providing intelligent tasks other than cultivation, for example, thinning, selective spraying, data collection, and possibly even planting and harvesting. Selective spraying can include actuation and/or controlled movement of to direct delivery from nozzles or other delivery devices to apply wet or dry chemicals to commodity plants 60 or weeds 70, selected varieties of each, or both. Advantageously, chassis 102 and tool arms 300 can be used thereby used with a number of different modular and releasably attachable precision tool attachments 400 in addition to the illustrative tool attachment 400 disclosed herein.

Advantageously, chassis 102 can be propelled across commodity field 50 using standard farm equipment, for example a tractor having a suitable power takeoff (PTO) drive shaft and a hitch (not shown) to pull and operate chassis 102. As will be discussed further below, the hydraulic system 150 and electric system 180 can both be powered by hydraulic pump 152 driven by the tractor PTO.

Figure 5:
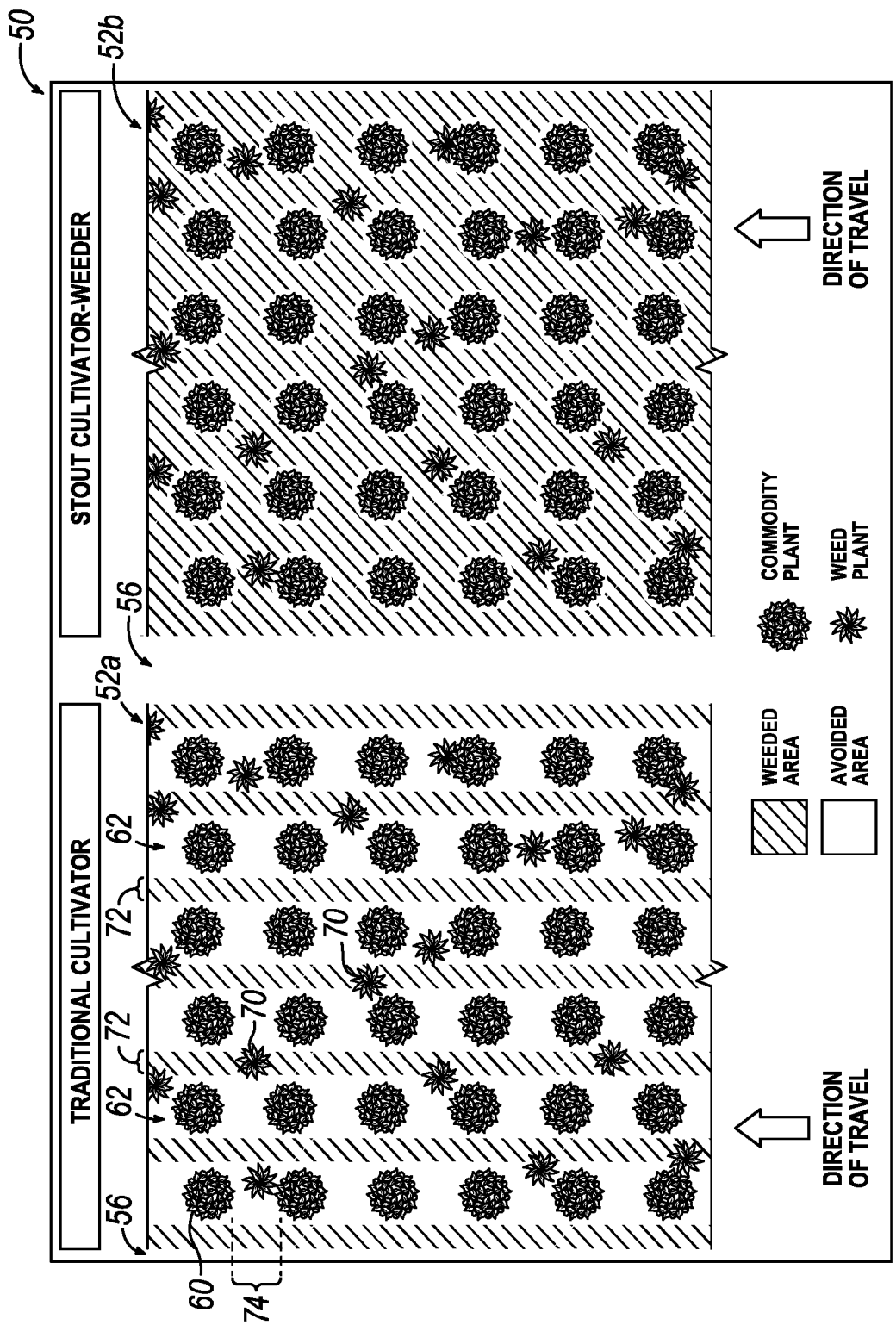
FIG. 5 illustrates commodity bed 52a cultivated with prior art implements and commodity bed 52b cultivated with the agricultural implement 100 of FIG. 1.

To understand an illustrative application of the illustrative implement 100 equipped with tool attachments 400 configured as a cultivator, refer now to FIG. 5. Commodity field 50 includes raised beds 52a and 52b, each bounded along the sides and separated by furrows 56. An illustrative western specialty row crop, for example, romaine lettuce, is illustrated as commodity plant 60. Bed 52a is illustrative of cultivating to remove weeds 70 using traditional cultivator implements. Specifically, while weeds 70 grow within plant lines 62 in the spaces 74 between the commodity plants 60 and in the spaces 72 between plants lines 62, traditional cultivating only reaches and cuts or otherwise disrupts weeds 70 located in the spaces 72 between the plant lines 62. The reason for this is that with traditional cultivators, the cultivating blades or other tools are static fixed devices which would destroy commodity plants 60 along with the weeds 70, if employed along the plant lines 62. This limitation has traditionally been addressed by using laborers to walk the beds 52a and manually remove the remaining weeds 70 located within spaces 74 between commodity plants 60 of plant lines 62 with a hand hoe.

As illustrated in bed 52b of FIG. 5, the illustrated implement 100 equipped with tool attachments 400 configured as a cultivator can be used advantageously to weed both the space 72 between plant lines 62 and the space 74 between commodity plants 60 within a plant line 62, also commonly referred to as a planting interval for a row or crop row.

As implement 100 is operated along plant lines 62 of commodity field 50b, a control system 200, including a vision module 500 and perception system 270, classifies and locates each commodity plant 60 along each plant line 62. By determining the center point location and/or bounds of each commodity plant 60 the blades 414 of cultivator tool 410 can be actuated to avoid damaging commodity plant 60.

The above listed and additional features of the illustrative implement 100 will now be disclosed in further detail.

Referring to FIGS. 6 and 7, a chassis 102 provides a universal, smart, modular implement platform for a variety of precision agricultural implement applications. Chassis 102 generally includes a frame 110, wheel assemblies 120, a hitch receiver 140, a hydraulic system 150, and an electrical system 180. Frame 110 can include a front crossbar 104, a rear crossbar or toolbar 106, and end plates 108. Additional features of chassis 102 that also support the mounting and operation of smart tool arm 300 along with toolbar 106 include plant line alignment bar 196, and threaded rod or screw 198, all of which will be discussed further below. A key distinction in the function of toolbar 106, plant line alignment bar 196, and screw 198 is that the toolbar 106 alone supports the weight of the smart tool arms 300, while the screw 198 and the plant line alignment bar 196 respectfully merely adjust the position of and move a portion of each of the tool arms 300 along the x-axis 90.

Frame 110 provides a rigid and rugged structure for supporting other components of chassis 102, including the wheel assemblies 120. End plates 108, for example ½ to ¾ inch plate steel, are secured to the ends of crossbars 104 and 106, which may be, for example, 4 inch×4 inch×⅜ inch wall tubular steel. The overall width of frame 110, particularly the length of crossbars 104 and 106, is selected to accommodate a range of raised bed widths. For example, the distance between furrow centers for some specialty commodities typically ranges from 40 to 82 inches. Such variations can exist within a single farming operation, therefore, the wheelbase span 138 of the centers of wheel assemblies 120 are adjustable to support operating chassis 102 for a range of different bed widths.

The illustrative wheel assemblies 120 are modular and can be slidingly mounted along and then secured in a desired position upon crossbars 104 and 106. Wheel assemblies 120 include generally support brackets 122, a rear axle 124 supporting a rear wheel 126, and a front axle 128 supporting a gauge wheel 130. The front axle 128 supporting the gauge wheel 130 is further supported by cantilever 132, which is pivotably attached at pivot 134 to the supporting brackets 122. Advantageously, hydraulic cylinder 172 couples between frame 110 and cantilever 132 to adjust the height of gauge wheel 130 relative to frame 110, thereby changing the pitch of the chassis 102 about a longitudinal x-axis 90. The pitch of the chassis 102 is controlled in order to set the pitch angle of blade 414 of tools 410 that will be further disclosed below. For cultivating, it is expected that the blades 414 will be preferred to be flat or to be slightly negative so that the leading edge of blade 414 is lower than the trailing edge of blade 414 to sever and displace the portion of weed 70 above the cut on its root.

Advantageously, the wheel assemblies 120 can each be slid along the crossbars 104 and 106 of frame 110 into a desired position for providing the desired wheelbase span 138, and then can be releasably secured into that position. Referring briefly to FIG. 1, the location of each wheel assembly 120 along the crossbars 104 and 106 can fixed and secured using thrust plates 136. More specifically, as is visible for crossbar 104, crossbar 104 extends through openings 123 of supporting brackets 122. The thrust plates 136 include a pair of plates and a threaded tightening system that enables the two plates to be separated and expanded between the crossbar 104 and a side of opening 123, thereby thrusting and compressing supporting bracket 122 and 104 securely into position. The thrust plates 136 can be used along two adjacent sidewalls of crossbar 104, thereby compressing and locking the crossbar into a corner of the opening 123, securing wheel assembly 120 in position along crossbar 104. As can be seen in portions of FIGS. 6 and 7, the same or similar components and features can be used to secure the wheel assemblies 120 to toolbar 106.

An illustrative hitch receiver 140 coupled to crossbar 104 can be used to pull chassis 102 with a three-point hitch as is typically found on farm tractors. The hitch receiver includes lower devises 142 and an upper clevis 146; however, other attachment and hitching systems could be used.

In order to isolate a range of rolling and pitching motions of the tractor (not shown) from the chassis 102, lower devises 142 include a vertical slot to receive hitch pins rather than a standard bore. The slots 144 allow the pins a range of travel, thereby allowing the tractor hitch to translate a distance up or down without displacing the chassis 102 from being supported solely by the rear wheels 126 and height adjustable gauge wheels 130. Similarly, upper clevis 146 includes horizontal slots 148 for receiving and providing a range of movement for the upper hitch pin for the same purpose.

Figure 11A:
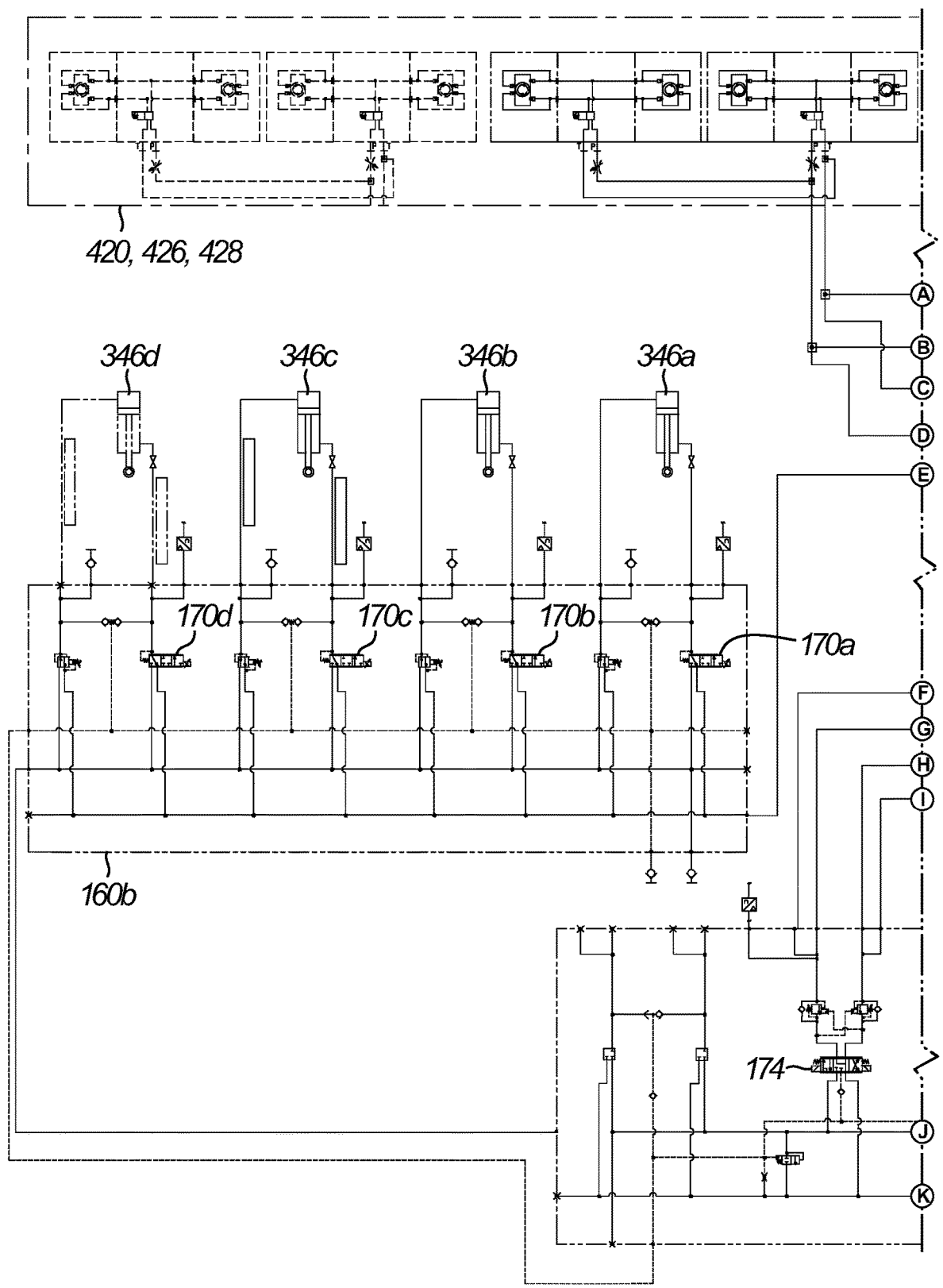
FIGS. 11A and 11B are a schematic diagram of a hydraulic system 150 of the agricultural implement 100 of FIG. 1.
Figure 11B:
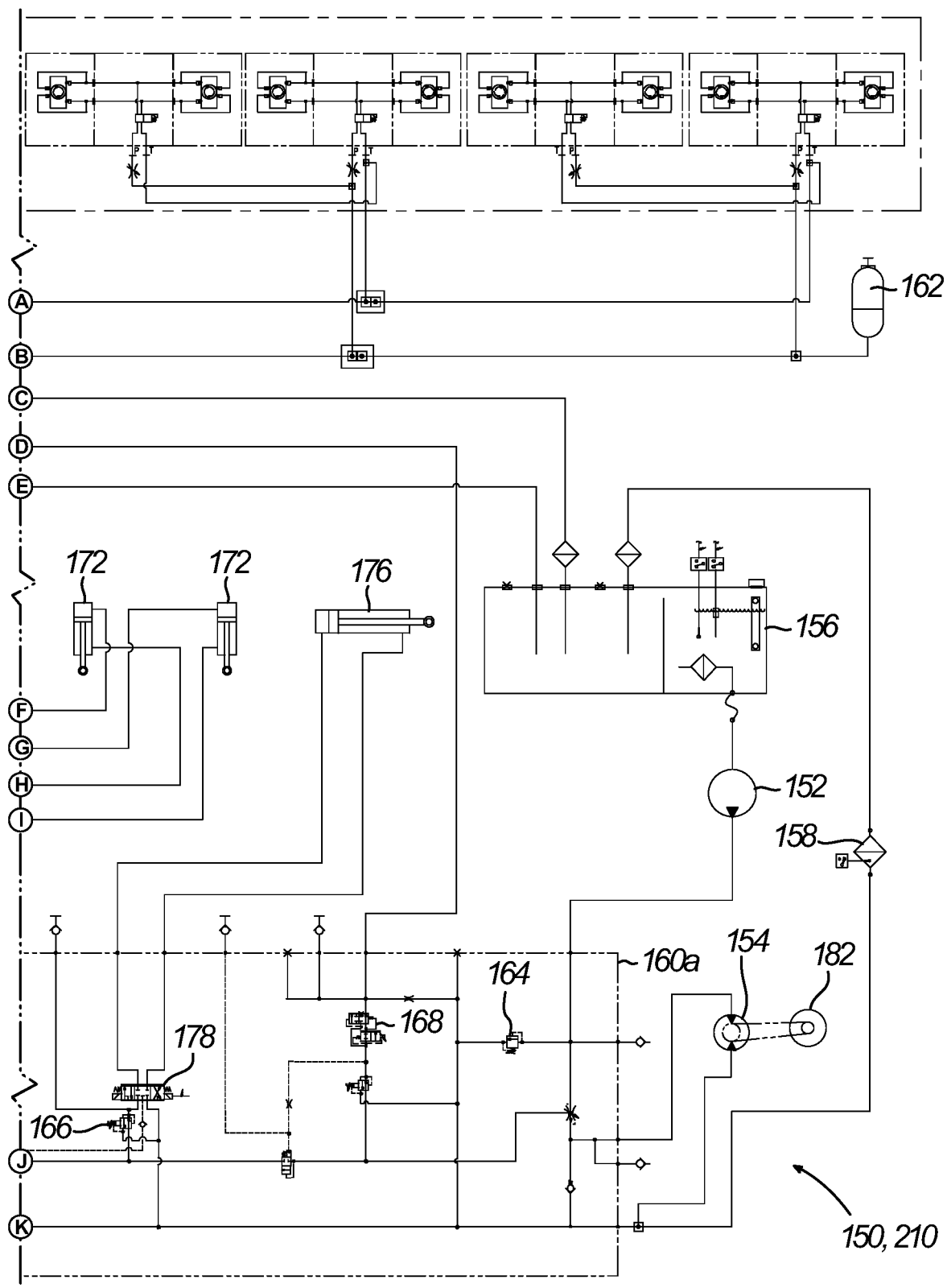

Referring briefly to a schematic of hydraulic system 150 illustrated in FIGS. 11A and 11B, the hydraulic system includes generally a power take off (PTO) driven hydraulic pump 152 to power from a tractor pulling the implement 100 the hydraulic system of chassis 102, hydraulic motor 154, reservoir 156, hydraulic oil cooler 158, distribution manifold 160, accumulator 162, and main regulator 164. Hydraulic motor 154 is driven by the hydraulic oil pressure provided by pump 152. Hydraulic motor 154 in turn drives, for example using a flexible belt, an electrical generator, for example, an alternator 182. Alternator 182, for example an automotive type electric alternator, provides DC electric power for electric system 180. Additional controls and actuators of hydraulic system 150 will be described below in further describing other aspects of implement 100.

Electrical system 180 of chassis 102 can be alternatively powered by alternator 182 or battery 186. Additionally, alternator 182 is capable of charging battery 186. Electrical system 180 includes a power distribution and regulation module 184 (FIG. 12) that can provide regulated voltage, for example 12 V DC and 24 V DC, and voltage and current transient protection. Electrical system 180 can also power thermostatically controlled hydraulic oil cooler fans 188 and control system 200, which will be described further below.

Figure 8A:
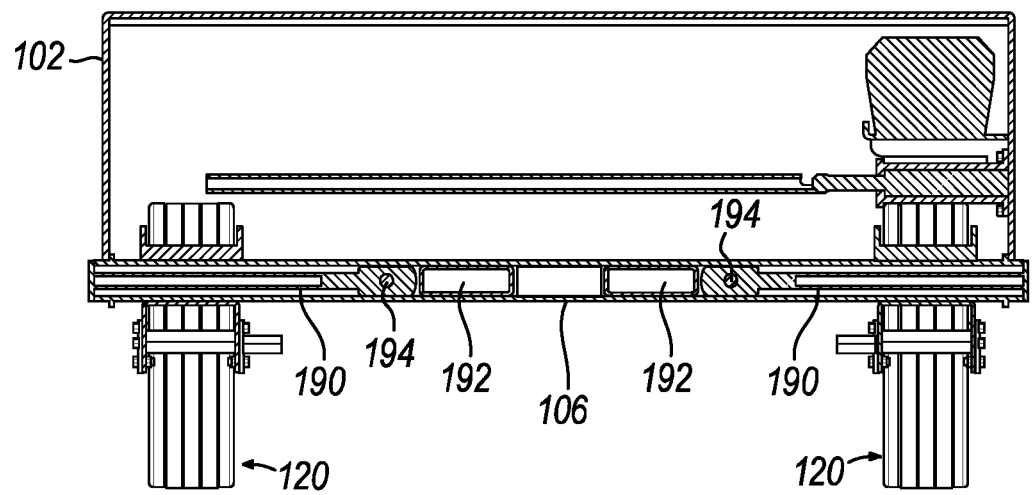
FIG. 8A is an cross-sectional elevational view of the chassis 102 of the agricultural implement 100 of FIG. 1 with safety struts 190 stowed, taken along the section lines illustrated in FIG. 4A.
Figure 8B:
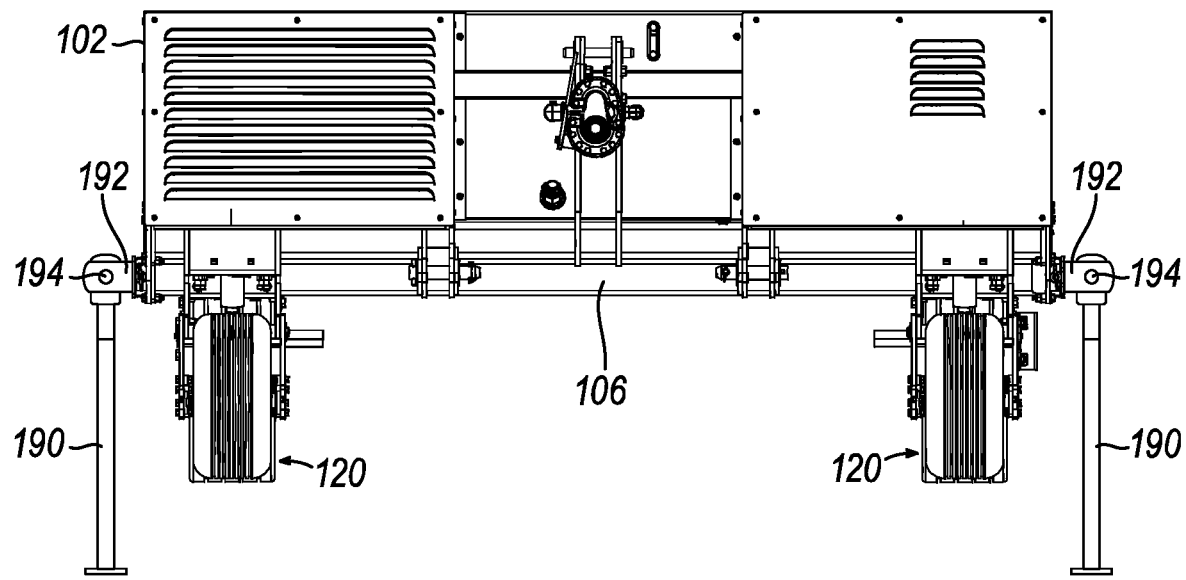
FIG. 8B is a front elevational view of the chassis 102 of the agricultural implement 100 of FIG. 1 with safety struts 190 extended.

FIG. 8A is a cross-sectional elevational view of chassis 102 with the cut-plane along the middle of crossbar/toolbar 106. Visible in this view are safety struts 190 and safety supports 192, which are illustrated in their stowed position within the toolbar 106. Advantageously, and as shown in the elevational view of FIG. 8A, each safety strut 190 can be pulled out from storage within a hollow tube portion of the toolbar 106 such that the safety strut 190 is fully extended, and the safety support 192 to which safety strut 190 is coupled about pivot 194 extends partly from the toolbar so that the safety struts can be oriented vertically downward. Thus, the safety struts 190 can be used to provide additional safety support of chassis 102, for example, when chassis 102 is elevated off of supporting wheel assemblies 120 by the three-point hitch of a tractor coupled to hitch receiver 140. The material and load strength of safety struts 190, pivots 194, and safety supports 192, can be selected to provide a significant margin of safety to support the weight of chassis 102 and all implements that may be attached to it.

Additional features of chassis 102 will be discussed further below, following a discussion of the modular smart tool arms 300 that can be supported and operated by chassis 102, for example, as is generally shown in FIGS. 1 and 2A.

Referring first to FIGS. 2 and 2A, for numerous decades, a toolbar, for example toolbar 106 apart from implement 100, has been the common point of attachment for agricultural tools to configure an implement for particular tasks and for particular commodity fields 50, whether it be for plowing, disking, planting, cultivating, spraying, harvesting, or chopping. In contrast, according to the present disclosure, the function of prior agricultural toolbars can be provided and further improved upon by the illustrative tool arm 300 and the tool platform 370 (FIG. 10) provided therewith. Advantageously, various tool attachments, for example, the illustrative tool attachments 400 shown in FIGS. 10 and 11, can be releasably mounted to and operated by tool arm 300 at tool platform 370. Various aspects of chassis 102, control system 200, and tool arm 300 provide for modular, repeatable, precision in the configuration and intelligent operation of tool attachments 400.

The tool arm 300 is modular in part in that it includes a mounting structure, for example, mount 310 which enables one or more tool arms to be releasably secured to toolbar 106 of chassis 102, for example, as shown in FIGS. 1 and 2A. The tool arm 300 is also modular in part because of the tool platform 370 and tool attachment 400 modularity introduced briefly above and discussed more specifically further below. Tool arm 300 is smart (intelligent) in part because it can optionally include a vision module 500 (FIG. 2), enabling intelligent automated operation of tool attachments 400 and optional data collection regarding commodity fields 50, both of which will be discussed further below.

Figure 3A:
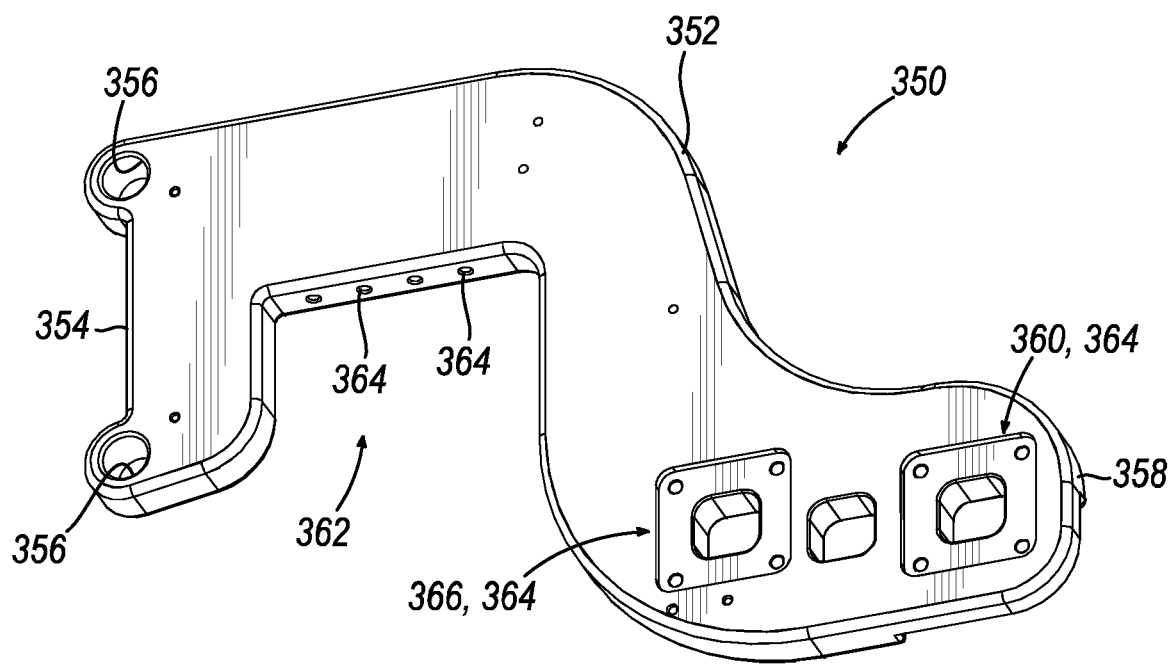
FIG. 3A is a first side perspective view of a backbone of tool arm 300 of FIG. 2.
Figure 3B:
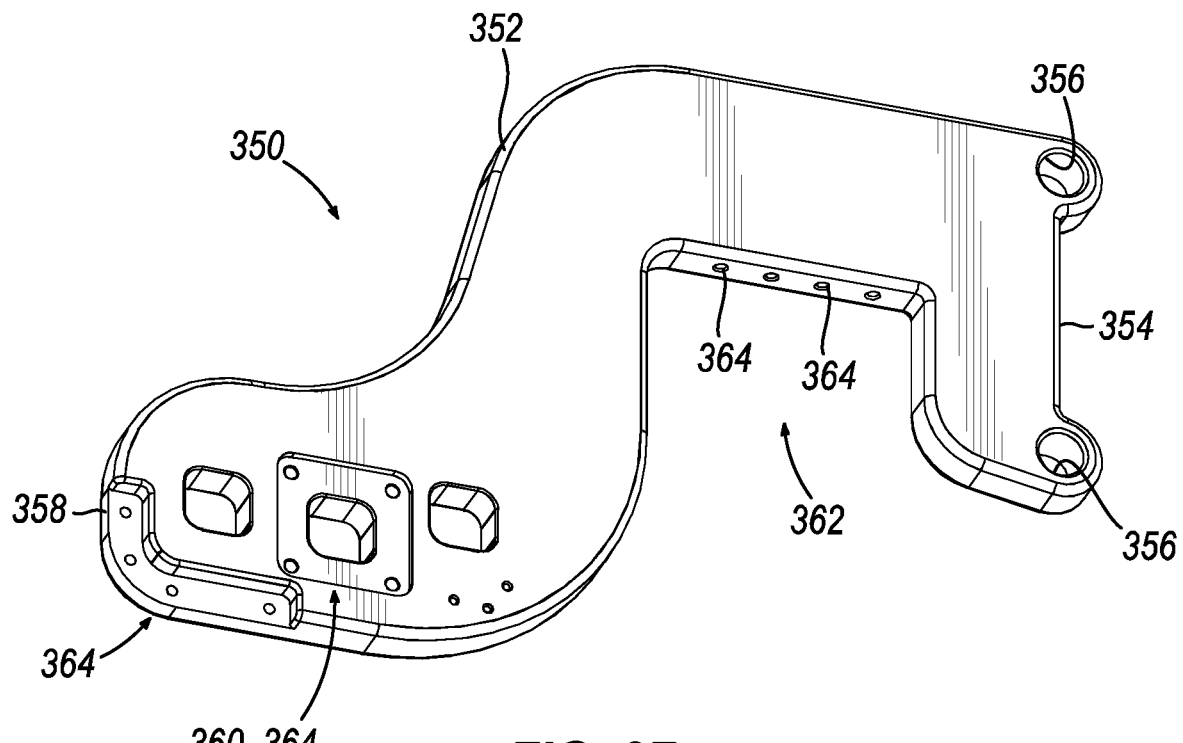
FIG. 3B is a second side perspective view of a backbone of tool arm 300 of FIG. 2.

An important aspect of the precision of tool arm 300 is the design and manufacture of a unitary or monolithic member for releasably mounting agricultural tools to, for example, a backbone 350. In the illustrative embodiment shown in FIGS. 2-3B, the backbone 350 is milled from a single aluminum billet, for example, approximately 1 to 1½ inch thick, which limits the weight of tool arm 300 while maintaining dimensional stability required for a modular precision agricultural functionality. Backbone 350 can include a number of precision mounting features 364, including for example, the use of location and/or interference fit tolerances in milling and adding features such as receiving bores, threaded bores, locating pins, recesses, and the like. These or other precision features may include with any of linkage mounts 356 adjacent a base end 354, tool mounts 360 adjacent tool end 358, a vision module receiving area 362, and a ground follower mount 366. These features are in contrast to prior art devices providing a tool attachment platform that includes numerous members forming frames and other platforms that lack uniformity of precision between one platform to another and/or that lack dimensional stability and lack light weight that enables precise motion control and ground following of the crop and field operation working portion of the tool arm 300.

As will be evident from the above and below discussions of the operation of implement 100 using control system 200, it is particularly important to maintain precise displacements between the vision module 500, the ground follower 390, and the tool attachment 400, which is why all three are modularly and precision mounted to a billet formed backbone 350.

Figure 9:
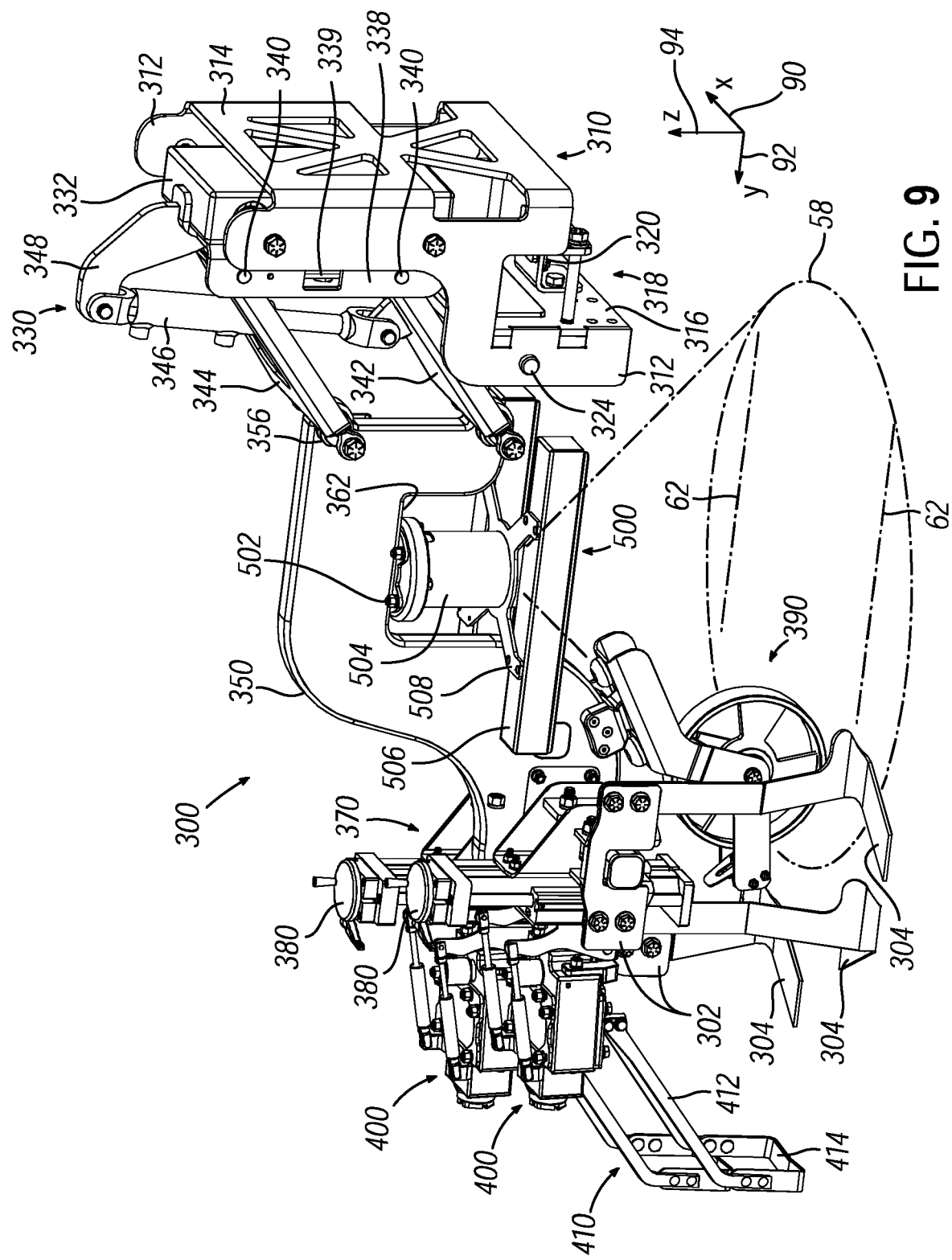
FIG. 9 is a side perspective view of the tool arm 300 of FIG. 2.
Figure 10:
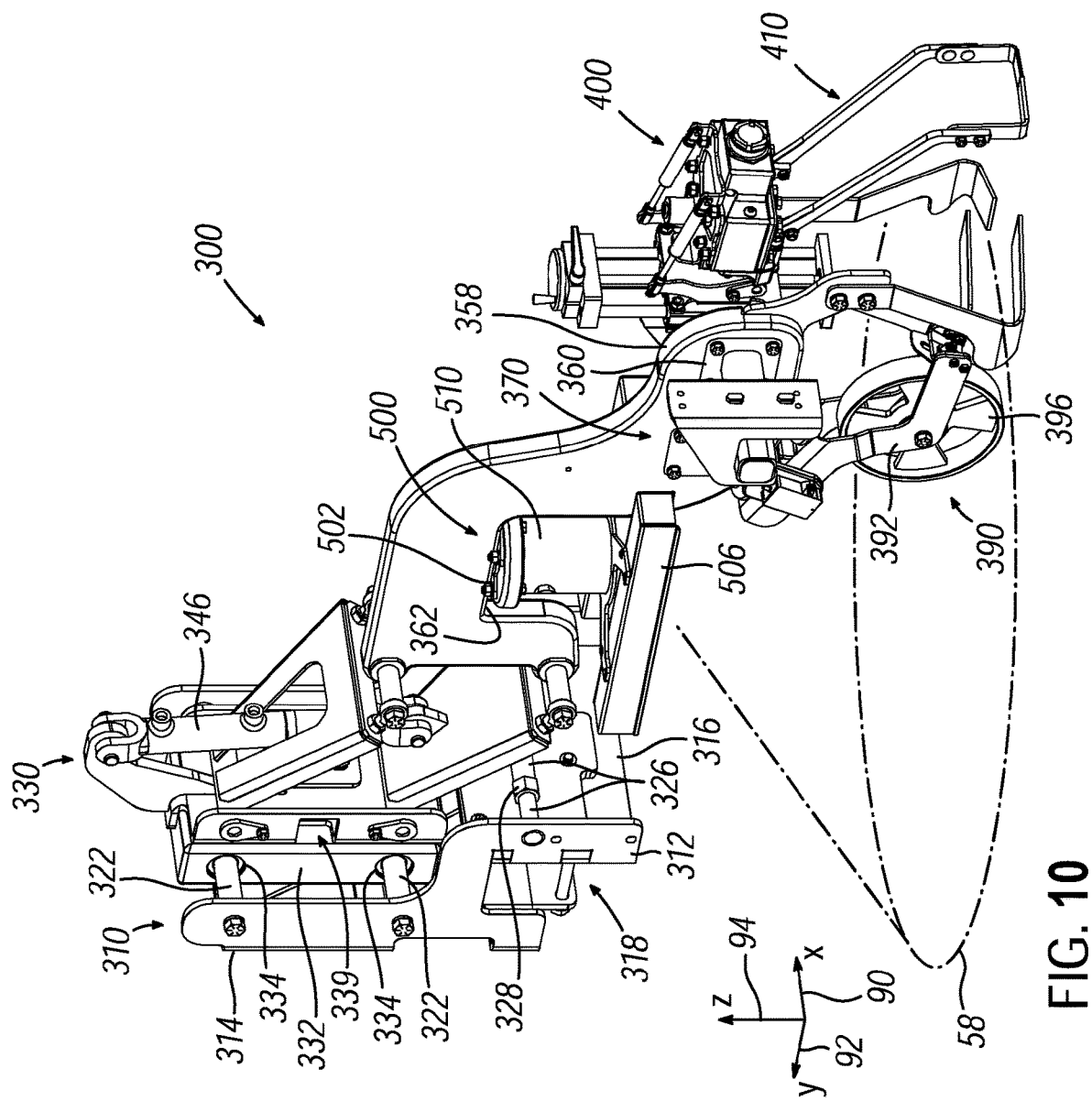
FIG. 10 is a end side perspective view of the tool arm 300 of FIG. 2.

Referring to FIGS. 9 and 10, tool arm mount 310 includes sides 312, back span 314, front span 316, clamp 320, and guides 322. Sides 312 are rigidly connected with back span 314 and front span 316. These components can be formed, for example, from ¼-⅜ inch steel or other rigid material. Sides 312 define an opening 318 which is sized to receive toolbar 106 so that mount 310 may be secured thereon, for example, as shown in FIG. 1. As shown for FIG. 4A, the clamp 320 can be used to fixedly secure mount 310 onto toolbar 106.

A system of adjustment left or right on toolbar 106 is included with the mount 310 and can be utilized before clamp 320 is secured to more easily move tool arm 300 into a desired position along the length of toolbar 106. Referring to FIG. 10, sides 312 also define bores 324 that provide clearance for threaded rod 198 to pass therethrough. Advantageously, by locating a pair of sleeves 326 around threaded rod 198 and between sides 312, and locating a threaded adjustment nut 328 between the sleeves 326, small adjustments left and right to mount 310 along toolbar 106 can be made. For example, by holding one of adjustment nut 328 and coupling 199 from rotating, while at the same time rotating the other about threaded rod 198, the mount 310 will shift left or right depending on the direction of rotation. For example, a coupling 199 is secured to the threaded rod 198. If coupling 199 is held to prevent rotation while threaded adjustment nut 328 is rotated about the threaded rod 198, the nut will translate left or right on the thread, thereby translating sleeves 326 and mount 310 left or right with it.

Referring again to FIGS. 9 and 10, backbone 350 of tool arm 300 is coupled to mount 310 by articulating base 330. Advantageously, articulating base 330 provides translation of backbone 350 along the x-axis 90 and the z-axis 94 relative to mount 310. The x-axis 90 is the axis parallel to the longitudinal axis of toolbar 106, and the z-axis 94 is the vertical axis perpendicular to the longitudinal axis of toolbar 106 and perpendicular to the working surface 58 of a commodity field 50. The articulating base 330 includes generally a linear slide table 332, linkages 342 and 344, and a lift actuator, for example, a lift hydraulic cylinder 346 for vertically supporting and translating backbone 350 relative to the mount 310.

Referring to FIG. 10, linear slide table 332 includes linear bearings 334 that translate along guides 322 of mount 310. More specifically, guides 322 can be hardened cylindrical rods that provide a precision and wear resistant surface for linear bearings 334 to ride upon. This configuration advantageously allows backbone 350 and attached tool attachment 400 to translate smoothly and precisely along the x-axis 90 of chassis 102 particularly because movement of the excess mass that would be involved with translating toolbar 106, mount 310, and other additional structure such as frame 110 is avoided.

Still referring to FIG. 10, brackets 338 each define an opening 339 sized for receiving therethrough a plant line alignment bar 196, as is shown in FIGS. 1 and 2A. Referring to FIG. 4A, advantageously, the linear slide tables 332 of each of the tool arms 300 mounted to chassis 102 can be each clamped to alignment bar 196 such that translation of the alignment bar 196 along its longitudinal axis, for example using hydraulic cylinder 176 actuated by side shift valve 178, will simultaneously and equally shift the slide tables 332 and attached backbones 350 and tool attachments 400 of each of the tool arms 300.

Figure 4B:
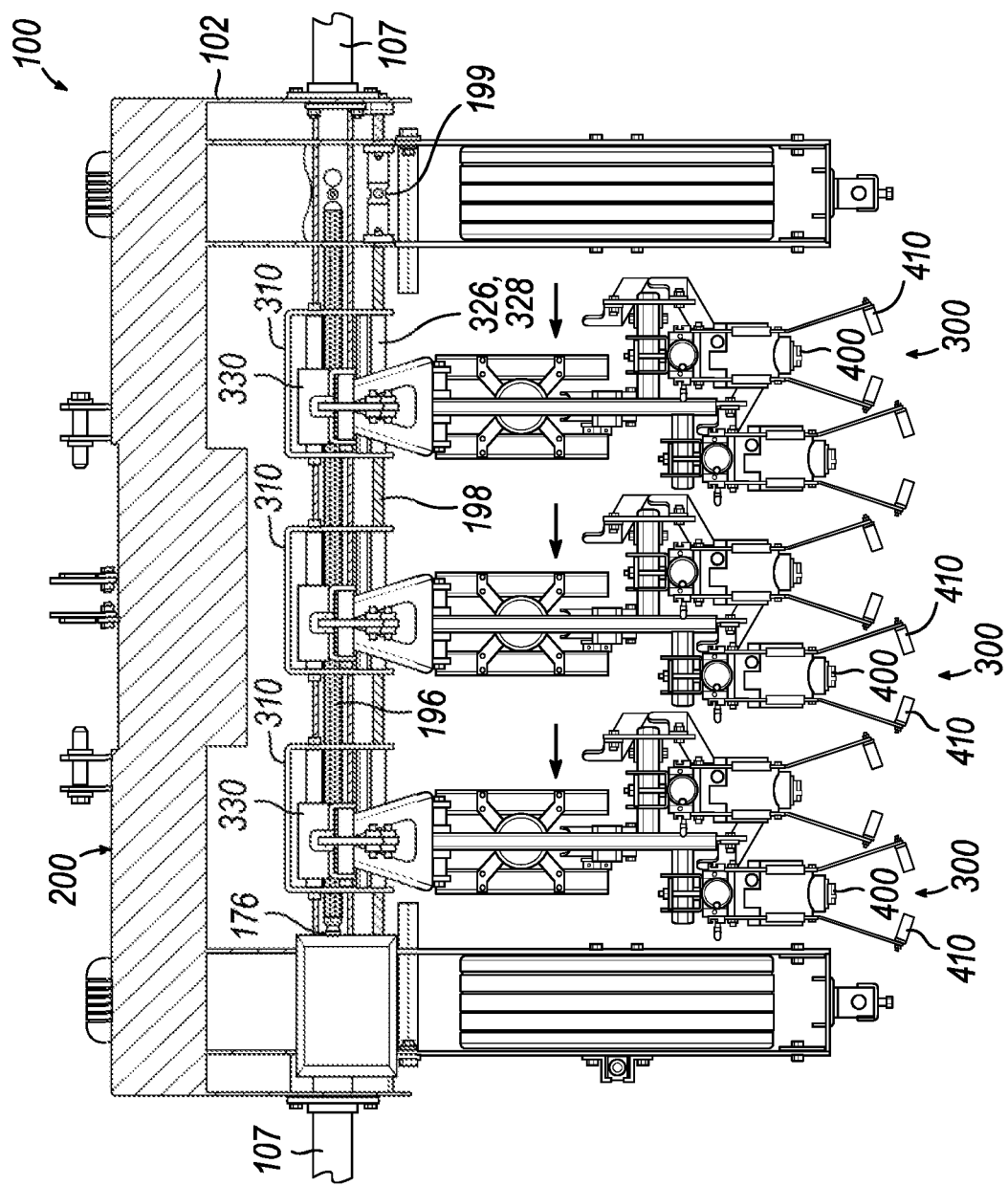
FIG. 4B is a cross-sectional top view of the agricultural implement 100 of FIG. 1 illustrated in a second state.

For example, referring to FIG. 4B and comparing it to FIG. 4A, in FIG. 4B the hydraulic cylinder 176 has been retracted, shifting plant line alignment bar 196 to the left and translating with it the articulating base 330, backbone 350, and tool attachment 400 portions of the tool arms 300. The spacing of the tool arms 300 relative to each other remains precisely the same. Additionally, the large mass components such as mounts 310 of tool arm 300, toolbar 106 and other portions of frame 110 and chassis 102 remain in place.

The movement of the least amount of mass as practical to precisely, smoothly, and quickly shift the tool attachments 400 left and right overcomes various disadvantages found in prior machines. For example, the actuation of hydraulic cylinder 176 left or right can be used to continually and precisely align tool attachments 400 with plant lines 62 of the commodity field 50 to account for shifts in plant lines 62 that occurred during planting and to account for shifts in the tractor pulling chassis 102. Additionally, the control system 200 may include a side shift position sensor 238 (not shown), for example a switch indicating when plant line alignment bar 196 is centrally located, left of center, and right of center, or, alternatively, an absolute position encoder can be used, either of which facilitate closed loop control of the position of plant line alignment bar 196 and thus the position of tool attachments 400 in alignment with plant lines 62.

Referring to FIG. 9, an illustrative four-bar linkage is formed in part by a bottom link 342 coupled between pivot 340 of bracket 338 and linkage mount 356 at base end 354 of backbone 350. The four-bar linkage also includes top link 344 coupled between pivot 340 of bracket 338 and linkage mount 356 of backbone 350. Cantilever 348 is coupled to the linear slide table 332 that brackets 338 are coupled to, and support an end of the lift hydraulic cylinder 346, the opposite end of which is coupled to bottom link 342 approximately mid-span. As arranged, retraction of lift hydraulic cylinder 346 translates backbone 350 and attached tool attachment 400 vertically upward along the z-axis 94 to a lifted or retracted position, as is shown in FIG. 9 and FIG. 1. In other embodiments (not shown) a different pivot and/or linkage structure can be substituted for the four-bar linkage 336 to provide movement through the z-axis 94 for tool arm 300.

The lifted position of tool arm 300 is useful to secure the tool attachments 400 attached to tool arm 300 up and away from the ground, for example, when implement 100 is transitioning between commodity fields 50 or between the end of set of plant lines 62 and the beginning of an adjacent set. Additionally, if operating in a field 50 with fewer plant lines 62 per bed 52 than the implement 100 provides, then one or more tool arms 300 can be selectively actuated to and locked, e.g., manually/hydraulically or via system hydraulic controls 210, in the lifted position so that only those required for the number of plant lines are lowered and used, advantageously, without have to physically remove tool arm 300 or components thereof from implement 100. The height of each tool arm 300 relative to the working surface 58 is set by the extension and retraction of hydraulic cylinders 346 for each tool arms 300 attached to chassis 102.

In one embodiment, the height is controlled by controlling the continuous hydraulic pressure applied to each end of the piston of lift hydraulic cylinder 346. In another embodiment, the height is controlled by controlling the continuous differential of the hydraulic pressure applied across the ends of the piston of the lift hydraulic cylinder 346. In yet another embodiment, discussed further below, the height is controlled by setting a continuous regulated hydraulic pressure to one end of the piston of the lift hydraulic cylinder 346, and by continuously controlling the hydraulic pressure applied to the other end of the piston of the lift hydraulic cylinder. For example, a proportional solenoid valve 170 (FIG. 11A) and analog pressure sensors (unnumbered, FIG. 11A) can be used as part of the control of the hydraulic pressure to control the height of the tool arms 300, as can feedback from a height sensor 398 of tool arms 300 above the working surface 58, as is discussed further below.

For example, upon reaching the end of plant lines 62, the hitch of the tractor pulling chassis 102 can be used to lift it up by hitch receiver 140. A lift sensor, for example, a pressure switch 218 (FIGS. 11A and 11B) associated with gauge wheel hydraulic cylinder 172 can detect that weight is off of the front axle 128 and activate a transit mode of control system 200, or a tilt sensor, accelerometer, ultrasonic sensor, or other motion, orientation, elevation, and distance sensor known in the art may be used. Upon the control system 200 detecting via pressure switch 218 that chassis 102 has been lifted, tool arm lift valves 170 can optionally actuate hydraulic cylinders 346 of the tools arms 300 to lift them to the raised position, thereby providing clearance between tools 410 and the ground. Additionally, if side shift position switch or encoder 238 detects the plant line alignment bar 196 is not mechanically centered, along with tool arms 300, then control system 200 actuates side shift valve 178 and side shift cylinder 176 to a reset position, for example, the alignment bar 196 and attached tool arms 300 are returned to mechanical center of the chassis 102 for the next operation. Additionally, control system 200 can deactivate the processing by vision module 500, perception system 270, and control of tool attachment 400 by ruggedized controller 202 until the chassis 102 has been lowered and weight is again detected on front axle 128 via pressure switch 218, thereby pausing the working of a crop and/or field by an operation of the tool arms 300 at least until the chassis 102 is again lowered.

Returning to the discussion of tool arm 300, lift hydraulic cylinder 346 also can be controlled during operation to lighten the downward force toward the ground of tool arm 300 due to the weight of the various components of the tool arm. By applying hydraulic pressure to each actuation end of lift hydraulic cylinder 346, as introduced above, and individually controlling each of those pressures, thus also controlling the differential pressure, the amount of downward force operating on each tool arm 300 is very dynamically controllable, and responsiveness to following changes in the soil profile/level in the bed 52b for each of the individual tool arms 300, as will be discussed further below in the section further discussing the control system 200.

In a working or down position in which lift hydraulic cylinder 346 is at least partly extended (not shown) the various tool attachments 400 attached to the illustrative embodiment of the tool arm 300 are configured as a cultivator with a preferred operating depth of a short depth under the surface of the soil of bed 52. Referring now to FIGS. 2 and 10, the ground follower 390 of tool arm 300 helps maintain the vertical position of backbone 350 along the z-axis 94 such that the tool attachments 400 supported by the backbone 350 remain at a preferred depth or height relative to a working surface 58 of a field 50. In the illustrative embodiment shown in FIG. 2, ground follower 390 includes a lever 392 pivotably coupled at a proximal end to the backbone 350, extending downward at an angle from the backbone, and coupled to a distal end of the lever is a ski, wheel, and/or other member for contacting and following the working surface 58, for example, a roller 396 rotationally coupled to the lever 392. In the illustrative embodiment, the roller 396 does not support any weight of the tool arm 300 within a normal range of motion through which the lever 392 pivots as the height of backbone 350 above the working surface 58 varies; however, a stop 394, for example, an elastomeric bumper or the like, mounted between the lever 392 and tool arm 300 acts as a mechanical limit to provide a limit to downward reduction of height of the backbone 350 above the working surface 58, thereby limiting the range of downward movement of supported tool attachments 400 along the z-axis 94.

The illustrative embodiment also includes a height sensor 398, for example an angular encoder, for determining the relative height of the backbone and thus the working tools to the working surface 58. For example, the height in the illustrative embodiment is based on an lever pivot angle 399 of the lever 392 to the backbone 350, which changes as the mass of the lever 392 and roller 396 keeps the roller 396 in contact with the working surface 58 as a z-axis distance between the backbone 350 to the working surface 58 changes. In other embodiments the height sensor may be a ranging, accelerometer, or other sensor capable of determining the relative height of the backbone 350 or tool attachments 400 to the working surface 58.

The z-axis 94 location of the end of the various tool attachments 400 attached a tool arm 300 are generally set at a desired height below the bottom of roller 396 and ski 398 for the illustrative application of cultivation. By the control system 200 controlling the hydraulic pressure applied to a first port of the lift hydraulic cylinder 346 to provide upward lift to backbone 350, at least a portion of the weight/mass of and supported by the tool arm 300 is supported and the downward force of the roller 396 is reduced in order to prevent soil compaction and excess lowering of the tool arm, while also maintain enough downward force and system responsiveness to follow the elevation of the soil surface of the bed 52 being worked.

For example, in an illustrative embodiment, a continuous regulated hydraulic pressure of 600 psi provided to a first port of lift hydraulic cylinder 346 that provides upward movement of the backbone 350, and a continuous regulated hydraulic pressure of 200 psi provided to a second port of lift hydraulic cylinder 346 that provides downward movement of the backbone 350, provides a desired 'float,' i.e. upward offset or relief of the weight of and supported by the tool bar 300, to provide responsive following of the working surface 58 by the ground follower 390 and thus the tool arm 300 and supported tool attachments 400, while also preventing excessive compaction of the working surface 58 by the ground follower 390, which would extend the working tools downward beyond a desired height relative to the working surface 58.

Furthermore, in the illustrative embodiment, the control system 200 receives data from one or more pressure sensors 222 for measuring the hydraulic pressure at the first and the second port, or the differential hydraulic pressure, along with receiving data from the height sensor 398, which together are used by the control system 200 to actively regulate one of the continuous differential hydraulic pressure between the first and second port, or the continuous regulated pressure applied to the first port, in order to maintain the tool arm 300 and supported tool attachments 400 at a desired height along the z-axis 96 relative to the working surface 58. In one embodiment, a proportional hydraulic valve 170 controlled by the control system 200 controls a continuous but variable hydraulic pressure to the first port, feedback of that pressure is provided by the pressure sensor 222, and the continuous regulated backside pressure to the second port is preset and not variably controlled. An advantage in responsiveness and precision in desired height of the tool arm 300 over a working surface 58 having varied conditions and varied elevation is provided over prior art designs by the combination of the continuous and regulated downward pressure supplied to the second port, and the continuous variably controlled upward pressure supplied to the first port of the lift hydraulic cylinder 346. In one illustrative embodiment, a separate proportional hydraulic valve 170 and pressure sensor 222 is used for each of the tools arms 300 and hydraulic cylinders 346. In one illustrative embodiment, the control system 200 incorporates a low pass filter to the height control data from the height sensor 398, and/or other damping to the control of the height of the tool arm 300. In another illustrative embodiment, the lever 392 is fixedly mounted to the backbone 350.

Referring now to FIGS. 9 and 10, a vision module 500 includes module housing 504 which can be precisely coupled to backbone 350 by mounting interface 502 and precision mounting features 364, for example precisely located threaded bores and/or locator pins, within a protected vision module receiving area 362. The vision module 500 also includes a pair of lamps 506 coupled to vision module housing 504 by lamp mounts 508. In the illustrative embodiment, the lamps 506 are of sufficient intensity to greatly reduce or eliminate the effects of sunlight and resulting shadows that may otherwise be experienced by vision module 500 and associated perception system 270.

In the illustrated embodiment, camera 510 and optics 516 are packaged with a cylindrical vision module housing 514 and optional module housing lens protector 522.

The correlation of locations and distances within captured images is critical to determining the timing of when to open and close tools 510 to avoid a commodity plant 60 which has been identified in an image captured a known distance ahead of the tools 410. To improve the correlation of the location of the commodity plant with the actuation of tools 410, it has been found advantageous to take into account fixed, variable, and asynchronous processes relating to detecting and correlating a commodity plant with the machine-relative coordinate space. For example, applying an image timestamp upon the perception system 270 receiving the first data packet containing part of a new image from the vision module 500, and applying a timestamp to data from the odometer encoder 232 based on the midpoint time between the data request and the receipt of the data.

An example of the coordinate space and tracking of the location of objects of interest and the tools 510 in the coordinate space can be understood from FIG. 5, which correlate to the change in relative location of the objects of interest, e.g. commodity plant 60 and weeds 70, and the tool blades 414 as the implement 100 traverses the plant line 62. Each pair of plant lines 62 in a field of view in the illustrative embodiment correlates to the x-axis 90 and y-axis 92 dimensions of the coordinate space, divided along each axis into a desired level of pixel or bin resolution that correspondingly relates to the images and actual distances imaged and traversed.

Referring to FIG. 9, optionally the tool platform 370 of tool arm 300 may include a device for adjusting or actuating tool attachment 400 relative to backbone 350, for example a z-axis linear slide table 380 as shown in the illustrative embodiment. One reason to include adjustment for each separate tool attachment is due to variations found in commodity fields 50 among different plant lines 62 within the same bed 52a. For example, depending on the formation and environmental conditions such as compaction and erosion of bed 52a, individual plant lines 62 may vary in height. For example, there may be a crest across the bed 52a such that plant lines on one part of the bed are at a lower elevation than plant lines on another part of the bed, which also may vary from the relative elevation of the furrows within which wheel assemblies 120 of the chassis 102 ride.

Referring now to FIGS. 9 and 10, an illustrative tool attachment 400 can be modularly and precisely coupled to tool arms 300. Base 402 is coupled to the tool arm 300, for example, to tool platform 370 or optional z-axis linear slide table 380. A crop or field working tool actuator, for example, actuator 420 of tool attachment 400, can be a hydraulically driven actuator that includes housing 430 coupled to base 402 via a lower pivot coupling 408 and a pneumatic damper 422.

In the illustrated example shown in FIG. 9, the tool arm 300 cultivates two adjacent plant lines 62; therefore, each tool arm 300 includes a pair of tool attachments 400, one for each plant line 62. The tool platforms 370 on the left and right side of backbone 350 are spaced along the x-axis 90 so that the distance between the two tool attachments 400 matches the distance between plant lines 62. Additionally, the illustrative tool arm 300 is equipped with static mounts 302 which have attached static cultivators 304, each positioned to cultivate and clear weeds located within the space 72 between plant lines 62.

As discussed earlier above, illustrative tool attachments 400 include tools 410 for cultivating the space 74 between adjacent commodity plants 60 within plant line 62. As illustrated in FIG. 4A, actuator 420 is in a normal and failsafe position in which arms 412 and blades 414 of cultivating tools 410 are spread apart a distance sufficient so that the blades traverse the open space 74 between plant lines 62, as illustrated in FIG. 5 and do not contact the root or other portion of commodity plant 60. Upon actuation of tools 410 by actuator 420, shafts 466 extending through covers 432 of the housing 430, and upon which arms 412 are attached by mounting features 468, rotate in a synchronize fashion to translate blades 414 into close proximity, thereby cultivate the space 72 between the commodity plants 60 within the plant line 62.

The actuation of tools 410 provided by the actuator 420 is advantageous in that the movement of the tools 410 are synchronized and provide a transition time between the open and close positions that can be adjustable by an electronic solenoid controlled valve 426, for example, a proportional flow valve set by controller 202 and/or input at HMI 204, and/or a flow regulator 428 (not shown), located directly at housing 430 in the illustrative embodiment to reduce latency and other undesirable characteristics with more remote activation. Additionally, actuator 420 provides a slow initial and final speed and ramping up and down from initial and final speed to the transition speed to avoid impulse like accelerations and decelerations, thereby greatly reducing or eliminating any harmonic induced or other vibrations of arms 412 and blades 414 and also greatly reducing or eliminating disturbance of soil that could damage the commodity plants 60, including from throwing soil onto the commodity plants, as with prior designs, which can inhibit growth and or induce spoilage.

Referring to FIG. 4A, in one illustrative embodiment of implement 100, a second and third set of tools arms 300 are provided by coupling toolbar extensions 107 to each end of the toolbar 106 of chassis 102. Advantageously, the frame 110, wheel assemblies 120, hydraulic system 150, electrical system 180, and control system 200 have all been sized to accommodate the added loads of three sets of on or more tool arms 300, thereby reducing the number of passes required to complete cultivation of a commodity field 50 by a factor of three.

Figure 12:
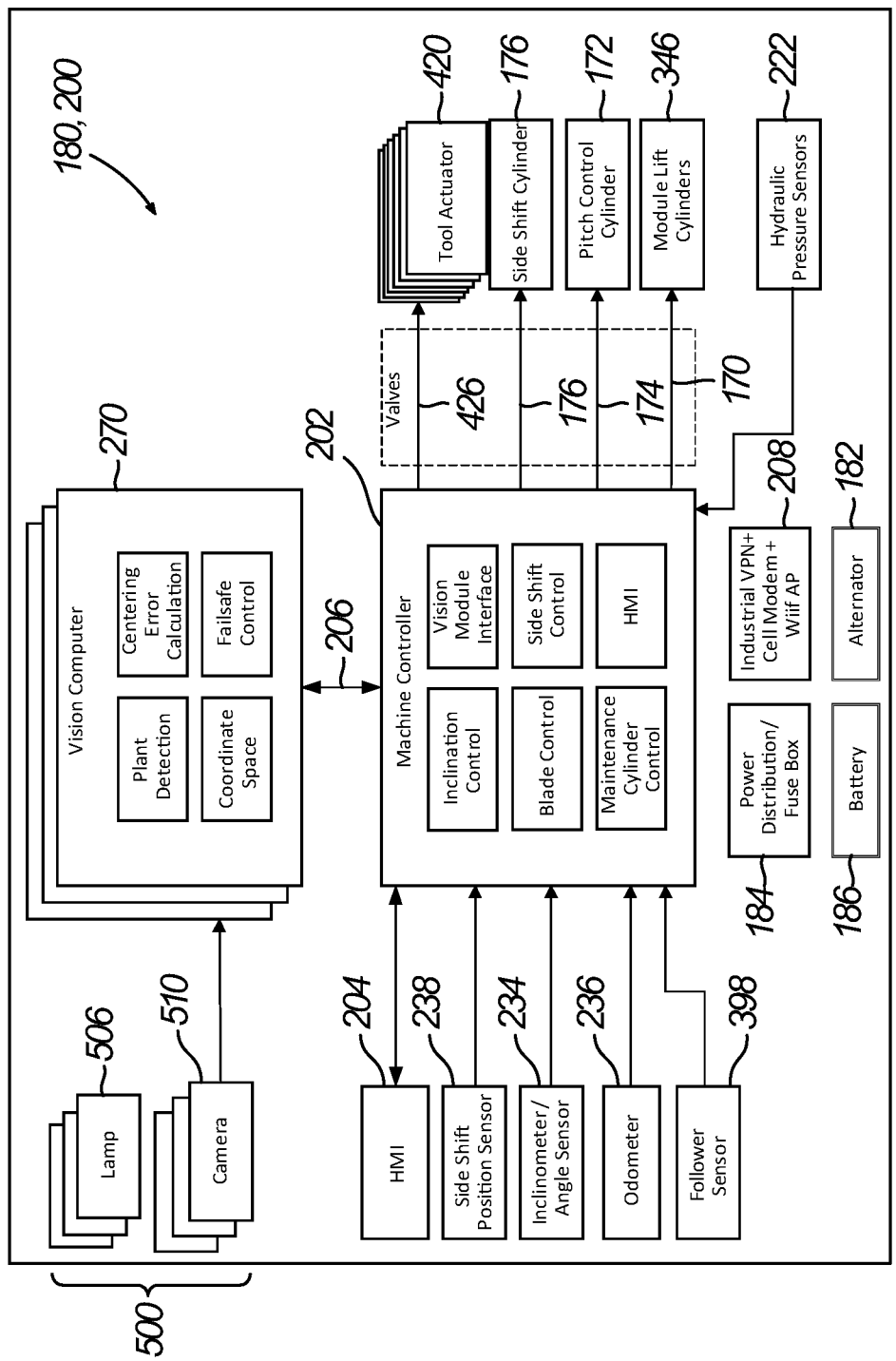
FIG. 12 is a schematic block diagram of an electrical system 180 and control system 200 of the agricultural implement 100 of FIG. 1.

Referring to FIG. 12, a schematic block diagram illustrates aspects of electrical system 180, including control system 200. Control system 200 can includes a ruggedized controller 202, for example, an X90 mobile controller available from B&R Industrial Automation of Roswell, Ga., and a machine vision/perception computer 270, including a graphics processor (GPU) 272 such as a TX2i available from NVIDIA Corp. of Santa Clara, Calif. Controller 202 provides overall machine control of implement 100, and perception computer 270 includes processing of images received from vision module 500, including a neural network, for example, a convolutional neural network (CNN) for AI processing of images and optionally other data to classify, locate, and bound objects of interest, including at least commodity plants 60, and optionally other objects, including for example, weeds 70 and debris (not shown), and to provide a confidence level associated with the classification and/or bounding. Classification of objects of interest may include the plant or weed variety, health, for example, including a disease state/type, and other attributes in the art that are knowable optically. Alternatively, a single computing unit may be substituted and provide the machine control, image, and AI processing. Also alternatively, some or all of the functions provided by one or both of the machine controller 202 and perception computer 270 may be provided by the vision module 500. The perception computer 270 may also include pre-processing of images prior to processing by the CNN, and/or post-processing of data resulting from the CNN processing of images.

In some implementations or selected use of implement 100, control of the tool attachment 400 may only require processing of objects classified as the commodity plant of interest, in other implementations or selected use, control may only require processing of objects classified as weeds or a set of weed types, and in yet another implementation or selected use, control may require processing of both commodity plants and weeds. For example, depending on whether the attached tool attachment 400 is being used for weeding, thinning, or application of chemicals, including selectively on one or both of commodity plants and weeds.

Control system 200 also includes various controls 230, generally interfaced with controller 202, for example via a wireless or wired local area network (LAN) 206, for example, Ethernet. Controls 230 may include HMI 204, for example a touchscreen display device, and various input sensors, including a tilt sensor/inclinometer 234, odometer encoder 236 mounted with axle 124 (FIG. 5), side shift position switch or encoder 238, and various hydraulic pressure sensors 212-222. Control system 200 also includes output controls, generally controlled by controller 202, including valves controlling hydraulic actuators, including cylinders, discussed above. Machine controller 202 thus generally controls actuator 420 to close and open cultivator tools 410 around commodity plants 60, side shift of tool arms 300 to maintain alignment of the tool attachments 400 with plant lines 60, pitch control of blades 414 via control of gauge wheels height, controlling the height of tool arms 300 to maintain proper blade depth 414, and to lift and/or center tools arms 300 in a transit mode when raising of implement 100 is detected.

Perception computer 270 provides the image processing, including bounding, classification, confidence, and location mapping of objects of interest, including commodity plants 60, to implement the general process illustrated by FIG. 4 and discussed further above, including providing the data necessary for some of the processes controlled by controller 202, including the closing and opening of the cultivator tools 410 around commodity plants 60, and side shifting of the tool arms 300 to maintain alignment of the tool attachments 400 with plant lines 60. To do this, perception computer 270 provides generally AI enabled object detection, and maps the detected objects to a relative coordinate space derived from timestamping of displacement data from the odometer encoder 236, image timestamping, and determination of objects of interest, including the centerline of plant lines 62 relative to vision module 500, and thus relative to the tool attachments 400.

Advantageously, the operation of implement 100 is not dependent on GPS or other such absolute or geographic positioning data or systems and can function solely using the relative positions of the plant lines 62 and the commodity plants 60 detected by the perception computer 270. Advantageously, the operation of the control system 200, including perception computer 270 and controller 202, may be autonomous in that it does not require remote data or computer resources; however, a local or remote wireless or wide area network (WAN) connection 208 may be used to remotely monitor, update, or to optionally supplement the data and computing resources of the control system 200.

An illustrative HMI for setup of control system 200 can include selecting a commodity plant type, a unit of measurement, and the spacing between commodity plants 62 with the plant line 60 and the spacing between adjacent plant lines 60.

An illustrative HMI can include entering the distance from the blades 414 of each tool attachment 400 to the center of field of view of the camera module 500 on that tool arm 300. Other configuration relating to the tool attachment 400 can include timing information relating to the cycling of the blades 414 through their range of motion. Other configuration information includes cooling fan 118 temperature trigger, pressure limit settings and delay and transition times for the actuation up and down for the tool arms 300, odometer 336 calibration for rear wheel 126, ground pressure backside and wheels threshold.

An illustrative HMI can includes the overall status of control system 200, voltage of electrical system 180, hydraulic oil pressure and temperature, and settings selected on setup page 242. Additional control settings that can be selected include the distance prior to plant center to open tool 410, the distance after plant center to close tool 410, machine angle, which sets the pitch of blades 414, and a percent of ground pressure, which relates to how much the tool arm 300 lift hydraulic cylinder 346 lightens the weight of the tool arm 300 applied to the ground by ground follower 390. And finally, a system start/stop selection and a tool arm lift/lower selection is provided.

An HMI 204 can also provide a selectable real-time view from each vision module 500 and an alarm page.

Advantageously each vision module 500, which in the illustrative embodiment includes one camera 510, is centered between two plant lines 60 and has a sufficient field of view for typical spacing between plant lines 60 in beds 52$b$ to have within its field of view and process the classification, confidence, location, and/or bounds for up to at least two plant lines 60 simultaneously. Tracking two plant lines 60 by a single camera and image not only reduces hardware requirements, but also provides for more precise plant line following than is provided by one camera centered on and tracking each plant line. Additionally, for embodiments that limit each camera 510 to tracking two plant lines, instead of tracking all plant lines 60 in a bed 52$b$, better resolution, precision, and data collection is provided by the vision module 50.

Lamps 506 are strobed at an intensity near sunlight levels to minimize the impact of variations in sunlight and on shadows that dependent on environmental conditions and time of day. The set of images and data to train the CNN used with perception computer 270 can nonetheless include images taken in various environmental conditions and times to day to improve functionality.

For commodity plants 60 and optionally other objects that are classified and for which a location, bounding, and confidence level is desired, the image timestamp is matched to data from the odometer 232 for that timestamp, or, to save communication and computing bandwidth for the odometer, odometer data can be interpolated from the odometer data spanning the image timestamp. The odometer location of the plant can be determined from the timestamp, for example, by offsetting the odometer location based on the conversion from pixels that the plant is from the center of the field of view of the image. Finally, the odometer data increment at which the plant will be located at the location of blades 414 can then be determined by knowing the odometer distance between the center of the field of view of the image and thus camera 510 and the blades 414.

Alternatively, the location mapping of the commodity plants 60 can be done based on odometer and pixel conversions to real world measurement coordinate space, or to a different, even arbitrary measurement and location base for a coordinate space, as long as it correlates to the real world location of the camera 510, blades 414, and plants 60. Additionally, image flow of objects between consecutive images can be processed by perception computer 270 to determine speed and relative distances/locations over time, including when plants 60 will be located at blades 414 without requiring the use of data from an odometer 236.

Because the systems of implement 100 are designed to be automatic once calibrated and set up, for example, including detecting plant lines 62, side shifting tool arms 300 to follow the plant lines, and to complete the selected working operation, such as weeding, on the field 50, advantageously no added in-cab controls are required for monitoring or operating implement 100. The HMI 204 is generally located on the implement 100 and any in-cab controls on the tractor 40 are optional, for example via a wireless device, for example a tablet computer or other handheld or mounted touch screen device, including for optional in-cab observation, changing settings, or initiating or ceasing operation; however, all that is required from tractor 40 to operate implement 100 is navigating across field 50 and raising and lowering the chassis 102 at the beginning and end of the plant lines 62.

The control system 200, including machine controller 202 and perception system 270, can perform the processing and control to providing autonomous working of the plant lines 62. For example, the processing and control includes, but not limited to, detecting plant lines 62; centering tool arms 300 on plant lines 62; classifying, assigning confidence, bounding, locating and tracking objects of interest, including optional pre-/post-processing functions known in the art; following the working surface 58 using lift cylinder 346 of tool arm 300, and operating the tool attachment 400 to perform the working operation for the plant lines 62.

Upon reaching the end of the plant lines 62, the implement 100 is lifted up off the wheels by the tractor 40 pulling the implement. The control system 200 responds by switching from the operate mode to transit mode. In transit mode, control system 200 ceases various operations controlled by machine controller 202 and perception system 270, including detecting plant lines 62, following the working surface 58 with lift cylinder 346, and the operation of the tool attachment 400. Additionally, any reset functions are completed, for example, recentering the tools arms 300 via side-shift actuator 176. If the field 50 is not yet completed, then the process continues at step 714 with aligning the implement 100 at the start of additional plant lines 62 and lowering the implement.

While the invention has been illustrated and described in detail in the foregoing drawings and description, the same is to be considered as illustrative and not restrictive in character, it being understood that only illustrative embodiments thereof have been shown and described and that all changes and modifications that come within the spirit and scope of the invention as defined in the claims and summary are desired to be protected.

REFERENCE NUMERAL LIST

| | |
|---|---|
| 40 | Tractor |
| 50 | Commodity Field |
| 52a | Prior Art Bed |
| 52b | New Bed |
| 54 | Bed Width |
| 56 | Furrow |
| 58 | Working Surface/Field-of-View |
| 60 | Commodity Plant |
| 62 | Line |
| 64 | Line Spacing 10" |
| 66 | Plant Spacing 10' |
| 70 | Weeds |
| 72 | Space Between Lines |
| 74 | Space Between Plants |
| 80 | Plant Center |
| 82 | Space Before |
| 84 | Space After |
| 90 | X-Axis |
| 92 | Y-Axis |
| 94 | Z-Axis |

REFERENCE NUMERAL LIST -continued

| | |
|---|---|
| 100 | Agricultural Implement |
| 102 | Chassis |
| 104 | Front Crossbar |
| 106 | Rear Crossbar/Toolbar |
| 107 | Toolbar Extension |
| 108 | End Plate |
| 110 | Frame |
| 112 | Thrust Plates |
| 114 | Cover |
| 116 | Hood |
| 118 | Tool Mounts [static cultivators] |
| 120 | Wheel Assembly |
| 122 | Support Brackets |
| 123 | Opening |
| 124 | Rear Axle |
| 126 | Rear Wheel |
| 128 | Front Axle |
| 130 | Front Wheel/Gauge |
| 132 | Front Cantilever |
| 134 | Pivot |
| 136 | Thrust Plates |
| 138 | Wheel Span |
| 140 | Hitch Receiver |
| 142 | Bottom Hitch Clevis |
| 144 | Vertical Slot |
| 146 | Top Hitch Clevis |
| 148 | Horizontal Slot |
| 150 | Hydraulic System |
| 152 | PTO Driven Pump |
| 154 | Hydraulic Motor |
| 156 | Reservoir |
| 158 | Oil Cooler |
| 160 | Manifold |
| 162 | Accumulator |
| 164 | Main Regulator |
| 166 | Side Shift Regulator |
| 168 | Tool Actuator Regulator |
| 170 | Tool Arm Lift Valves |
| 172 | Gauge/Pitch Actuator |
| 174 | Gauge Wheel Valve |
| 176 | Side Shift Actuator |
| 178 | Side Shift Valve |
| 180 | Electrical System |
| 182 | Alternator |
| 184 | Power Distribution/Regulation |
| 186 | Battery |
| 188 | Oil Cooler Fans |
| 190 | Safety Strut |
| 192 | Safety Support |
| 194 | Pivots |
| 196 | Plant line Alignment Bar |
| 198 | Threaded Rod/Screw |
| 199 | Rod Coupling |
| 200 | Control System |
| 201 | Enclosure |
| 202 | Machine Controller |
| 204 | HMI |
| 206 | LAN (Ethernet/Bus) |
| 208 | WAN Connection |
| 210 | Hydraulic Controls |
| 212 | PTO Pump Pressure |
| 214 | System Pressure |
| 216 | Motor Pressure |
| 218 | Gauge Cyl. Pressure Switch |
| 220 | Side Shift Press |
| 222 | Lift-Upside Press |
| 230 | Electric Controls |
| 232 | Odometer Encoder |
| 234 | Inclinometer |
| 238 | Side Shift Position |
| 240 | Touch Screen |
| 242 | Setup Page |
| 244 | Configuration |
| 246 | Control |
| 248 | Camera View |
| 270 | Perception System |
| 272 | GPU |

| REFERENCE NUMERAL LIST | |
|---|---|
| 274 | Ruggedized Housing |
| 280 | Convolutional Neural Network |
| 282 | Input |
| 284 | Output |
| 286 | Post Processing |
| 288 | Plant Map |
| 290 | Training |
| 300 | Modular Smart Tool Arm |
| 302 | Static Mounts |
| 304 | Static Cultivators |
| 306 | Raised Position |
| 308 | Lowered Position |
| 310 | Mount |
| 312 | Sides |
| 314 | Back Span |
| 316 | Front Span |
| 318 | Toolbar Passage |
| 320 | Clamp |
| 322 | Guides |
| 324 | Bore |
| 326 | Sleeves |
| 328 | Adjustment Nut |
| 330 | Articulating Base |
| 332 | Linear X-Axis Slide Table |
| 334 | Linear Bearings |
| 338 | Brackets |
| 339 | Alignment Bar Opening |
| 340 | Pivots |
| 342 | Bottom Linkage |
| 344 | Top Linkage |
| 346 | Lift Hydraulic Cylinder |
| 348 | Top Cantilever |
| 350 | Backbone |
| 352 | Billet |
| 354 | Base End |
| 356 | Linkage Mounts |
| 358 | Tool End |
| 360 | Tool Mount |
| 362 | Vision Module Receiving Area |
| 364 | Precision Mount Features |
| 366 | Ground Follower Mount |
| 370 | Tool Platform |
| 372 | Toolbar |
| 374 | Tool Mount |
| 376 | Precision Locator Features |
| 380 | Z-Axis Linear Slide Table |
| 382 | Linear Guides |
| 384 | Table |
| 386 | Adjust |
| 388 | Lock |
| 390 | Ground Follower |
| 392 | Lever |
| 394 | Stop |
| 396 | Roller |
| 398 | Height Sensor |
| 399 | Lever Pivot |
| 400 | Tool Attachment |
| 402 | Base |
| 404 | Mounting Features |
| 406 | Bracket |
| 408 | Pivot |
| 410 | tools-Cultivator |
| 412 | Arm |
| 414 | Blade |
| 416 | Pitch Angle |
| 418 | A/B Open/Close Position |
| 420 | Actuator |
| 422 | Pneumatic Damper |
| 426 | Proportional Solenoid Valve |
| 428 | Flow Regulator |
| 430 | Housing |
| 432 | Cover |
| 434 | Cavity |
| 436 | Bearing |
| 440 | Actuator Shuttle |
| 442 | Rack Teeth |
| 444 | Ends |
| 446 | Larger Bore |
| 448 | Bore End |
| 450 | Smaller Bore |
| 452 | Bore End |
| 460 | Pinion Gear |
| 462 | Body |
| 464 | Teeth |
| 466 | Shaft |
| 468 | Tool Mounting Features |
| 470 | Plug |
| 471 | Shoulder |
| 472 | Stem |
| 474 | Piston Head |
| 476 | Sealing Areas |
| 478 | Valve Receiver Bore |
| 480 | Fluid Channel |
| 482 | Recess/Supply Area |
| 488 | Spring |
| 490 | Valve |
| 492 | Valve Shaft |
| 494 | Bevel |
| 496 | Port |
| 498 | Valve Seat |
| 500 | Vision Module |
| 502 | Mounting Interface |
| 504 | Module Housing |
| 506 | Lamps |
| 508 | Lamp Mounting |
| 510 | Camera |
| 512 | Electronics Package |
| 514 | Connectors |
| 516 | Optical Lens |
| 518 | Dust Lens |
| 520 | Optics Housing |
| 522 | Module Housing Lens Protector |

The invention claimed is:

1. An implement for receiving and operating a plurality of agricultural tools, at least one of the plurality of agricultural tools supported by a tool arm, comprising:
 a chassis;
 a toolbar fixed to and spanning at least a portion of the width of the chassis, the toolbar for receiving and supporting the tool arm;
 an alignment member operably coupled to the chassis and the tool arm to provide movement of only a first portion of the tool arm along an axis parallel to a longitudinal axis of the toolbar, the second portion of the tool arm remaining fixed relative to the toolbar;
 a side shift actuator coupled to the alignment member to translate the alignment member; and
 a control system in communication with the side shift actuator to control movement of the alignment member and the first portion of the tool arm, thereby aligning the plurality of agricultural tools along the axis parallel to the longitudinal axis; and
 wherein the weight of the tool arm and the plurality of agricultural tools is fully supported by the toolbar.

2. The implement of claim 1, further comprising a plurality of wheels for supporting the chassis.

3. The implement of claim 2, further comprising an odometer coupled to one of the chassis and at least one of the plurality of wheels, the odometer in communication with the control system.

4. The implement of claim 2, further comprising:
 a hitch receiver coupled to the chassis and including at least three points of connection; and
 a lift sensor coupled to the chassis and in communication with the control system; and wherein upon the lift sensor detecting lifting of the chassis via the hitch interface, the control system enter a transit mode and operates the side shift actuator to center the alignment member with the chassis and pausing a crop working operation of the plurality of agricultural tools.

5. The implement of claim 2, further comprising:
a chassis pitch actuator; and
a power-take-off driven hydraulic pump; and
wherein:
   at least a first one of the plurality of wheels is coupled to the chassis pitch actuator to adjust a pitch of the chassis relative to a working surface of a field; and
   the hitch interface is configured to isolate pitch and roll of a vehicle coupled to the hitch interface from the pitch and roll of the chassis.

6. The implement of claim 2, wherein at least a pair of the plurality of wheels includes an adjustable wheelbase span.

7. The implement of claim 1, further comprising:
a chassis frame, the chassis frame including the toolbar; and
a plurality of safety stands each including a strut and a support, the strut pivotably coupled to the support; and
wherein:
the toolbar defines a tube; and
at least two of the plurality of safety stands are slidably received by and stored within opposite ends of the tube of the toolbar when not in use.

8. The implement of claim 7, wherein the pair of safety stands are operable to slidably extend the struts from an end of the toolbar with the support remaining coupled to the struts, at least a portion of the supports remaining within the toolbar, and the struts rotate vertically downward to support the chassis frame on the ground.

9. The implement of claim 1, wherein the tool arm further comprises:
a mounting structure coupled to the toolbar; and
an articulating base movably coupled to the mounting structure and further coupled to the alignment member to enable translation of the articulating base along an axis parallel to the longitudinal axis of the toolbar; and
a tool attachment platform coupled to the articulating base; and
wherein:
   the tool attachment platform operably receives and supports at least one of the plurality of agricultural tools,
   the first portion of the tool arm includes the articulating base and tool attachment platform, and
   the second portion of the tool arm includes the mounting structure.

10. The implement of claim 9, wherein the toolbar bears all weight of the mounting structure, the articulating base, the tool attachment platform, and the one of the plurality of agricultural tools when the one of the plurality of agricultural tools is not in contact with a working surface of a field, and the alignment member bears none of the weight.

11. The implement of claim 9, further comprising a threaded rod coupled between opposites sides of the chassis, parallel to the longitudinal axis of the toolbar, and wherein: the mounting structure interfaces with the threaded rod to provide adjustment of a mounting location of the mounting structure along a length of the toolbar; and the articulating base and the mounting structure are movably coupled with at least one linear motion bearing.

12. The implement of claim 9, further comprising a backbone member movably coupled to the articulating base to enable translation along an axis perpendicular to the toolbar; and wherein the tool attachment platform is coupled to the backbone member.

13. The implement of claim 12, further comprising at least a pair of linkages movably coupling the backbone member and the articulating base, and wherein the at least a pair of linkages, the backbone member, and the articulating base comprise a four-bar linkage enabling vertical translation of the backbone member relative to the toolbar.

14. The implement of claim 13, further comprising a lift actuator coupled with the four-bar linkage, the lift actuator controlled by the control system for controlling vertical movement of the backbone member and operating the one of the plurality of agricultural tools.

15. The implement of claim 14, further comprising a hydraulic system, and wherein:
   the lift actuator includes a hydraulic actuator having a first hydraulic port operable with hydraulic pressure to bias or translate the backbone member vertically upward and a second hydraulic port operable with hydraulic pressure to bias or translate the backbone member vertically downward;
   the hydraulic system provides a selected regulated pressure to second hydraulic port; and
   the hydraulic system provides a variable pressure to the first hydraulic port, the variable pressure controlled by the control system to maintain a vertical position of the one of the plurality of agricultural tools relative to a working surface.

16. The implement of claim 15, further comprising a ground following member including a lever rotationally coupled to the backbone member and a sensor for sensing the rotational position of the lever, the sensor in communication with the control system, thereby adjusting the variable pressure provided to the first hydraulic port to control the vertical height of the backbone member and associated one of the plurality of agricultural tools relative to the working surface of the field, based at least in part on position data received by the control system from the sensor.

17. The implement of claim 12, further comprising a ground following member for contacting and following a working surface of a field.

18. The implement of claim 17, wherein the ground following member includes a mechanical stop to limit a range of downward movement of the backbone member and the one of the plurality agricultural tools relative to the working surface of the field.

19. The implement of claim 17, wherein the ground following member includes a lever pivotably coupled to the backbone member and a sensor, the sensor in communication with the control system and providing ground following member position data to the control system to control a vertical height of the backbone member and the one of the plurality of agricultural tools relative to the working surface of the field.

20. An implement for receiving and operating a plurality of agricultural tools, comprising:
a chassis;
a toolbar fixed to and spanning at least a portion of the width of the chassis, the toolbar for receiving and supporting the plurality of agricultural tools;
an alignment member operably coupled to the chassis and the plurality of agricultural tools to provide movement of a portion of each of the plurality of agricultural tools along an axis parallel to a longitudinal axis of the toolbar;

a side shift actuator coupled to the alignment member to translate the alignment member;
a control system in communication with the side shift actuator to control movement of the portion of each of the plurality of agricultural tools;
a plurality of wheels for supporting the chassis;
a hitch receiver coupled to the chassis and including at least three points of connection; and
a lift sensor coupled to the chassis and in communication with the control system; and
wherein:
   the weight of the plurality of agricultural tools is fully supported by the toolbar; and
   upon the lift sensor detecting lifting of the chassis via the hitch interface, the control system enter a transit mode and operates the side shift actuator to center the alignment member with the chassis and pausing a crop working operation of the plurality of agricultural tools.

21. An implement for receiving and operating a plurality of agricultural tools, comprising:
a chassis;
a toolbar fixed to and spanning at least a portion of the width of the chassis, the toolbar for receiving and supporting the plurality of agricultural tools;
an alignment member operably coupled to the chassis and the plurality of agricultural tools to provide movement of a portion of each of the plurality of agricultural tools along an axis parallel to a longitudinal axis of the toolbar;
a side shift actuator coupled to the alignment member to translate the alignment member;
a control system in communication with the side shift actuator to control movement of the portion of each of the plurality of agricultural tools;
a chassis frame, the chassis frame including the toolbar; and
a plurality of safety stands each including a strut and a support, the strut pivotably coupled to the support; and
wherein:
   the weight of the plurality of agricultural tools is fully supported by the toolbar;
   the toolbar defines a tube; and
   at least two of the plurality of safety stands are slidably received by and stored within opposite ends of the tube of the toolbar when not in use.

\* \* \* \* \*